(12) United States Patent
Yoon et al.

(10) Patent No.: US 8,838,036 B2
(45) Date of Patent: Sep. 16, 2014

(54) SWITCH FOR TRANSMIT/RECEIVE MODE SELECTION AND ANTENNA POLARIZATION DIVERSITY

(75) Inventors: Seunghwan Yoon, Costa Mesa, CA (US); Bagher Afshar, Irvine, CA (US); Jesus Alfonso Castaneda, Los Angeles, CA (US); Brima Ibrahim, Laguna Hills, CA (US); Michael Boers, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 179 days.

(21) Appl. No.: 13/236,279

(22) Filed: Sep. 19, 2011

(65) Prior Publication Data

US 2013/0072125 A1 Mar. 21, 2013

(51) Int. Cl.
| | |
|---|---|
| H04W 24/02 | (2009.01) |
| H04B 1/40 | (2006.01) |
| H01P 1/10 | (2006.01) |
| H01P 1/12 | (2006.01) |
| H01Q 9/04 | (2006.01) |

(52) U.S. Cl.
CPC .. H01P 1/10 (2013.01); H04B 1/40 (2013.01); H01P 1/127 (2013.01); H01Q 9/0435 (2013.01)
USPC ............................ 455/67.11; 333/101; 455/73

(58) Field of Classification Search
USPC .............. 455/73, 83, 561, 562, 101; 343/800, 343/893, 756, 781, 795, 876, 853, 725; 333/21; 359/483.01–494.01; 370/329
See application file for complete search history.

(56) References Cited

U.S. PATENT DOCUMENTS

| | | | | |
|---|---|---|---|---|
| 3,008,001 | A * | 11/1961 | Reith | 348/110 |
| H880 | H * | 1/1991 | Patin | 333/116 |
| 6,252,559 | B1 * | 6/2001 | Donn | 343/781 CA |
| 6,411,824 | B1 * | 6/2002 | Eidson | 455/561 |
| 6,756,552 | B2 * | 6/2004 | Takenaka et al. | 200/224 |
| 7,868,818 | B2 * | 1/2011 | Henderson | 342/175 |
| 2008/0089452 | A1 * | 4/2008 | Henderson et al. | 375/346 |
| 2008/0252552 | A1 * | 10/2008 | Goebel et al. | 343/872 |
| 2009/0021436 | A1 * | 1/2009 | Clymer et al. | 343/713 |
| 2011/0215976 | A1 * | 9/2011 | Clymer et al. | 343/705 |
| 2012/0093100 | A1 * | 4/2012 | Qin et al. | 370/329 |
| 2013/0044037 | A1 * | 2/2013 | Soliman et al. | 343/818 |

* cited by examiner

*Primary Examiner* — Edward Urban
*Assistant Examiner* — Ralph H Justus
(74) *Attorney, Agent, or Firm* — Brinks Gilson & Lione

(57) ABSTRACT

A transceiver circuit includes a transmitter to send communication signals and a receiver to receive communication signals sent by other transmitters. The transceiver circuit also includes a switch to connect the transmitter and the receiver to at least one antenna. The switch controls at least two directions of polarization of the at least one antenna.

20 Claims, 16 Drawing Sheets

SWITCH FOR TRANSMIT/RECEIVE MODE SELECTION AND ANTENNA POLARIZATION DIVERSITY

TECHNICAL FIELD

The disclosure relates to switches. The disclosure also relates to a hybrid millimeter wave switch for transmit/receive mode selection and antenna polarization diversity.

BACKGROUND

The wireless communications industry is experiencing rapid growth. Wireless operators are searching for new solutions to be implemented into the wireless communication networks to provide broader bandwidth, better quality and new services. The use of millimeter wave frequency band may be considered a promising technology for broadband wireless. The Federal Communications Commission (FCC) released a set of rules governing the use of spectrum between 57 and 66 GHz. The large bandwidth coupled with high allowable transmit power leads to high possible data rates.

BRIEF DESCRIPTION OF THE DRAWINGS

The system may be better understood with reference to the following drawings and description. In the figures, like reference numerals designate corresponding parts throughout the different views.

DETAILED DESCRIPTION

The discussion below provides a hybrid millimeter-wave switch for selecting transmit/receive (T/R) mode of operation and antenna polarization diversity. With millimeter-wave or 60 GHz wireless systems, often there is no clear line-of-sight between a transmitter and a receiver of the wireless systems, which may cause a reduction in quality and reliability of a wireless link. The interior of buildings, for example, may include many obstacles to the wireless signals, such as walls, partitions, ceilings, and furnishings, which are surfaces to reflect the signals. Each bounce can introduce phase shifts, time delays, attenuations, and distortions that can interfere with one another at the receiving antenna.

In addition, 60 GHz systems can suffer from a problem of performance degradation when the polarization of transmitting and/or receiving devices is misaligned. In real-world applications, a user may not be able to rotate the device 90 degrees without losing the link. A drop of 20 dB can be observed on the received signal-to-noise ratio (SNR) when such misalignment occurs, which can cause drop-outs, lost and missed connections. In addition, in many applications, it may be difficult to know a direction of polarization of the antenna in the device, which could vary depending on how the manufacturer assembles the device, the way the user holds the device, etc.

Any or all switches described herein can provide for transmit/receive mode selection and antenna polarization diversity. Any or all switches can be implemented with complementary metal-oxide semiconductor (CMOS) or other semiconductor technology. The switches can provide low insertion loss and broadband performance with high port to port isolation. The switches can be a viable choice for 60 GHz phased-array transceivers with polarization diversity. The switches can also enable a shared antenna configuration which may reduce a package size of the switch and antenna.

Figure 1:
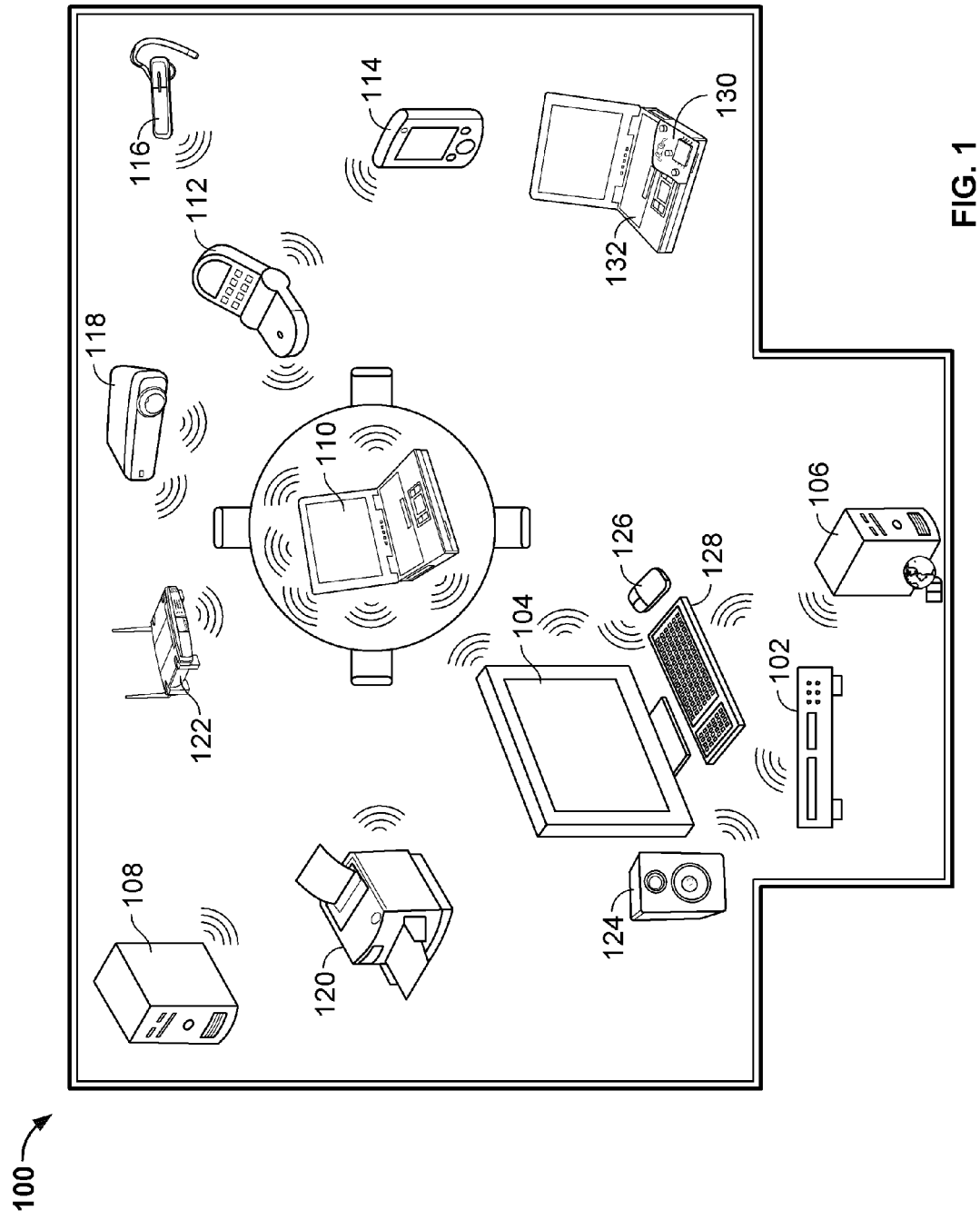
FIG. 1 is a block diagram of one example of an environment in which the antenna is used to wirelessly connect various endpoints with one another.

FIG. 1 is a block diagram of an exemplary environment 100 in which switches and antennas are used to wirelessly connect endpoints with one another. In general, switches may connect an antenna with a transmitter/receiver (TX/RX) (e.g., transceiver), to help provide a communication link between endpoints. The endpoints may be found in various contexts, including homes, businesses, public spaces and automobiles. In this example, the environment 100 is a room. The environment 100 can include multiple endpoints that may communicate wirelessly with some or all the other endpoints. In FIG. 1, a media player 102 (e.g., a Blu-Ray™) streams high definition video and audio content to a television (TV) 104. Similarly, a home media server 106 with a wireless network interface streams audio (e.g., MP3 content) and video (e.g., MP4, AVI, or MPEG content) to the TV 104 and to other endpoints in the environment 100.

Other examples of endpoints in the environment 100 include an application and file server 108 that is in communication with the laptop computer 110. Additional or alternative computing devices may be present in the environment 100 such as desktop and tablet computers, which may also act as endpoints. The laptop computer 110 wirelessly communicates with peripheral devices, such as a projector 118 and a printer 120. The media player 102 is also shown wirelessly communicating with the projector 118. The laptop computer 110 may also wirelessly exchange information with other endpoints such as a gateway or network router 122.

In FIG. 1, smartphone 112 (or in the alternative, a cell phone, personal digital assistant, or portable email device) and a portable gaming system 114 wirelessly exchange information (e.g., emails, text messages or video game saved game files). The smartphone 112 may also wireless connect to a radio receiver or other audio device such as earpiece 116. Other endpoints may exist in the environment 100, and different environments may include additional, fewer, or different endpoints. For example, the environment 100 may include stereo equipment, amplifiers, pre-amplifiers and tuners that wirelessly connect to each other and other endpoints in the room. Speaker 124 is shown wirelessly receiving audio signals from TV 104 to output sound from the TV.

Other examples of endpoints include musical instruments, microphones, climate control systems, intrusion alarms, audio/video surveillance or security equipment, network attached storage, pet tracking collars, or other devices. As additional examples, endpoints may further include automobile audio head ends or DVD players, satellite music transceivers, noise cancellation systems, voice recognition systems, navigation systems, alarm systems, engine computer systems, or other devices.

Computer components themselves may be wirelessly connected endpoints such that memory, mass storage devices (e.g., disk drive, tape drive), input devices (e.g. keyboard 128, mouse 126), output devices (e.g., display screen, printer 120) and central processing units may be the endpoints. Mouse 126 and keyboard 128 are shown wirelessly connecting with a display screen or TV 104. Endpoints may also include components that make up the computing devices, such as circuitry, electronics, semiconductors, processing units, microelectronic circuits, etc. (e.g., computer components 130 shown in the cutaway view of a laptop 132).

Figure 2:
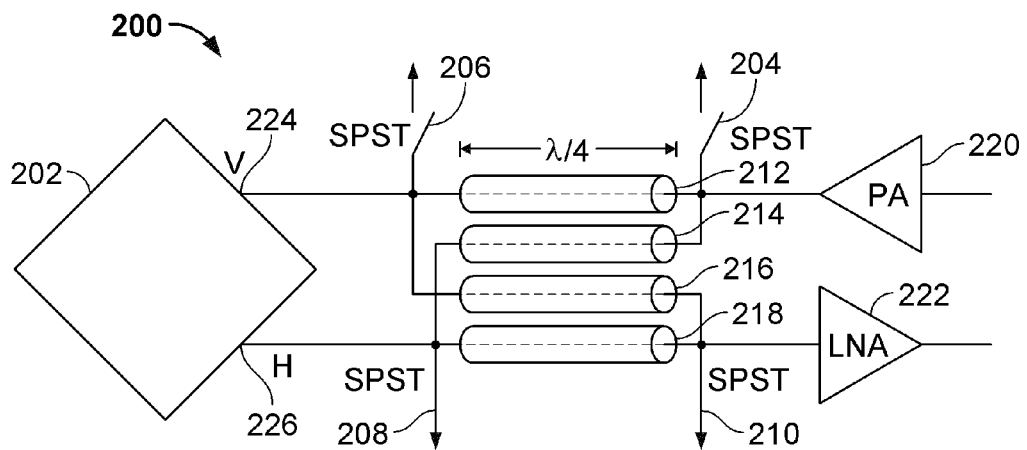
FIG. 2 is a block diagram of an exemplary switch for controlling transmit/receive mode and polarization diversity.

FIG. 2 is a block diagram of an exemplary switch 200. The switch 200 connects a transmitter 220 and a receiver 222 (e.g., transceiver) with an antenna 202. The switch 200, the transmitter 220, the receiver 222 and the antenna 202 may all be on the same chip, or some or all of them may be off-chip or on different chips. For explanation purposes, the switch 200 may be implemented as a combination or hybrid switch for transmit/receive (T/R) mode selection, antenna polarization selection, or both. In other words, the same, single switch 200 may be used for both antenna polarization diversity and transceiver mode selection. Polarization diversity includes at least two different directions of polarization. For example, the switch 200 may control the antenna 202 to operate in the vertical, horizontal, forty-five degree, circular or other polarization directions, such as left-handed and right-handed. In addition, the switch may control both transmit and receive modes at the different polarizations. An advantage of the switch 200 is that it may provide for lower loss than implementations that connect a polarization select switch and a separate mode select switch in series. The switch 200 does not require a cascade of switches to implement diversity and transmit/receive mode selection.

The switch 200 and transceivers may be manufactured for the broadband or millimeter-wave wavelength communications band, such as from about 57 GHz to about 67 GHz. An exemplary switch 200 is produced with a CMOS integrated circuit design. The switch 200 may also be configured using other techniques, including other semiconductor manufacturing techniques, such as those used to manufacture computer microchips, either integrated on the microchip such as with micro electro mechanical systems (MEMS) or off-chip with transistors or MEMS such that the grounding does not occur on the chip. In addition, the antenna 202 may be located on a same chip package as the switch 200 and the transceiver, or may be located separately and connected to the switch 200 such as via wires, solder, etc.

The switch 200 includes four single-pole, single-throw (SPST) switches 204, 206, 208, 210 connected in shunt via four quarter wavelength transmission lines 212, 214, 216, 218. The four SPST switches 204, 206, 208, 210 and transmission lines 212, 214, 216, 218 are connected and arranged to provide two inputs and two outputs of double-pole, double throw (DPDT) switch 200. Inputs to the switch 200 may include a radio element such as a transceiver, including power amplifier (PA) or other transmitter 220 and low noise amplifier (LNA) or other receiver 222. The transmitter 220 is used to sends signal and the receiver 222 receives signals sent out by other transmitters. The transmission lines 212, 214, 216, 218 connect receiver 222 and transmitter 220 ports to vertical 224 and horizontal 226 ports of the antenna 202. Four switches and transmission lines are used for explanation purposes, but other numbers of switches and transmission lines may be used.

Figure 27:
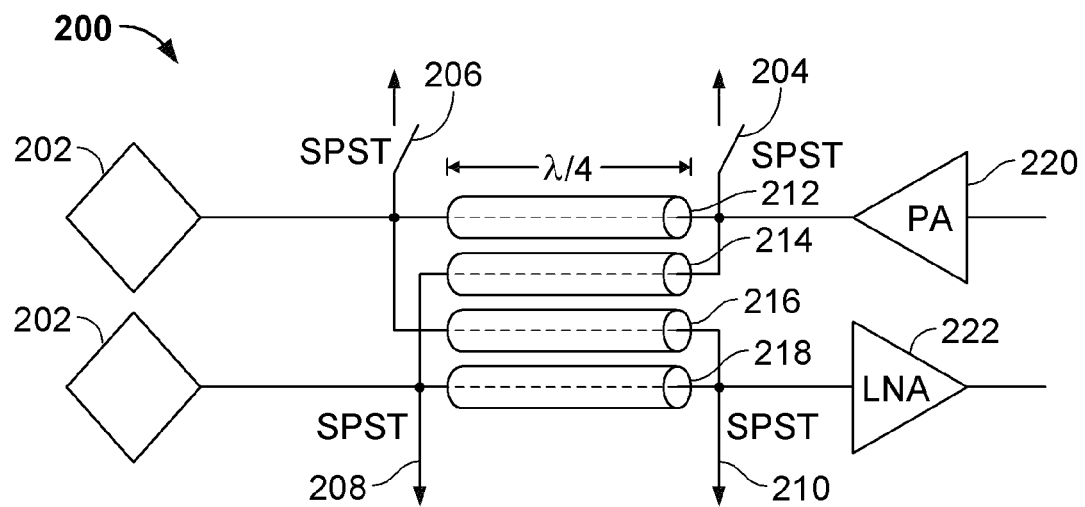
FIG. 27 is a block diagram of an exemplary circuit that provides selection between different antennas.

The switch 200 is used to control signals through the transmission lines 212, 214, 216, 218 to provide for antenna selectability or antenna mode selectability. In other words, the switch 200 may be set to select different modes of a single antenna (e.g., vertical, horizontal, circular polarization, etc.), or to select between different antennas having single or multiple polarizations. FIG. 27 is an example of a circuit that provides selection between different antennas 202. For example, the switch 200 may select between antennas having the same polarization, different polarization or some other different antenna feature that is desired to be selected (e.g., high gain, low noise, wideband, multiband). Therefore, if vertical polarization is desired, the switch 200 may allow signals to pass to an antenna having vertical polarization and for horizontal polarization the switch 200 may allow signals to pass to an antenna having a horizontal polarization.

For purposes of explanation, in this example, the antenna 202 is a dual polarization patch antenna which includes two ports 224, 226: one to excite the antenna 202 in the vertical polarization (V) and one to excite the antenna 202 in the horizontal polarization (H). The two ports 224, 226 are powered by two feeds from the switch 200. The ports 224, 226 are positioned orthogonally to each other on the antenna so that excitation of one feed line causes polarization in the vertical direction and excitation of the other feed line causes polarization in the horizontal direction. The feed lines are enabled and disabled by the switch 200. In other implementations, more than two antenna ports may be used and the switch 200 is constructed and arranged to excite the several or more ports on the antenna 202, such as to achieve polarization diversity. Antenna feed lines may be single-ended or may be fed with a differential signal. Each polarization of a differential feed may have two lines connecting to the antenna 202, for example, from the two opposite facing sides. The differential feed antenna may support more of a wideband and may require more routing lines on the package.

Figure 3:
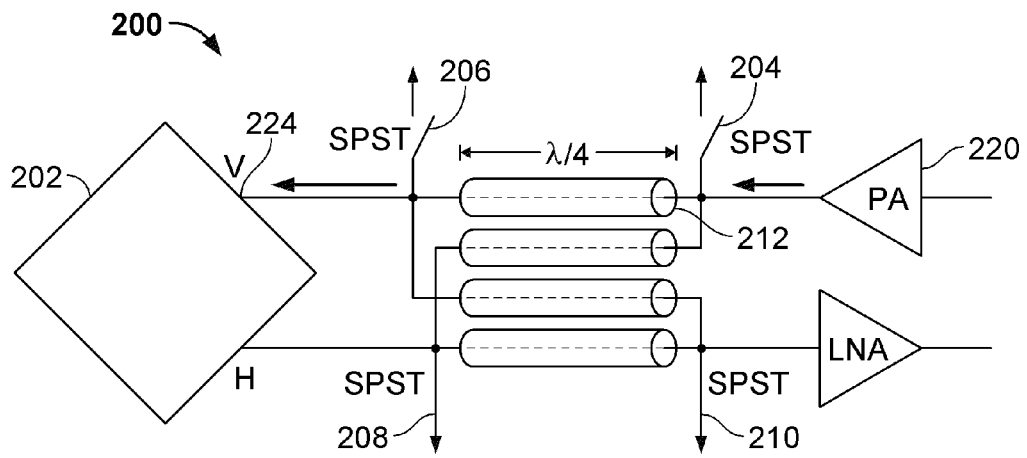
FIG. 3 is a block diagram of the switch of FIG. 2 being operated in a first mode.

FIGS. 3 through 6 are block diagrams to illustrate how the switch 200 may be used to control polarization and transmitter/receiver selection. The following examples demonstrate linear polarization diversity but the switch 200 may also be applied to an antenna having other polarizations such as circular polarization. In FIG. 3, for purposes of explanation the antenna 202 is a micro-strip or patch antenna that provides for vertical, horizontal and forty-five degree polarization depending on which port 224, 226 is excited. In another example, polarization diversity may be implemented with two antennas, one antenna for vertical polarization and the other for horizontal polarization. The switch 200 may also be used with other types and numbers of antennas.

When switch 204 (transmit) and switch 206 (vertical) are open or off, transmit/vertical shunt resistances are very high. In addition, switches 208 (horizontal) and 210 (vertical) are closed or on and demonstrate very low shunt impedances. Therefore, transmitter port to the vertical antenna port insertion loss is small, but transmitter to horizontal antenna port insertion loss is high. In other words, for antenna 202 to transmit in the vertical polarization mode, switches 204 and 206 are off and switches 208 and 210 are on, to shunt any horizontal and receiver signals to ground. Therefore, with the switches 204, 206, 208, 210 of switch 200 set is this position, signals from transmitter 220 flows through quarter wavelength transmission line 212 to the vertical port 224 of antenna 202 to transmit signals in the vertical polarization direction. An advantage of the switch 200 is that losses may be minimized since the signal only needs to travel through one quarter wavelength transmission line 212 when travelling between the antenna 202 and the transmitter 220/receiver 222. Three other examples of switch operation to control signal travel are illustrated in FIGS. 4 through 6.

Figure 4:
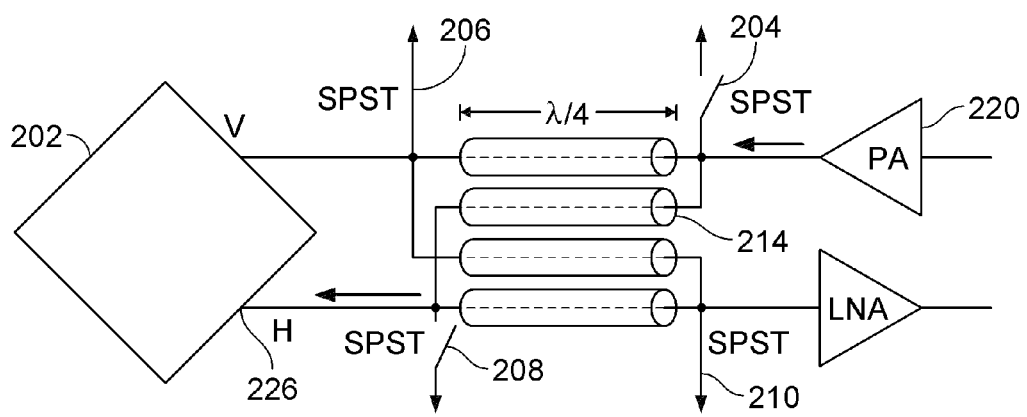
FIG. 4 is a block diagram of the switch of FIG. 2 being operated in a second mode.

In FIG. 4, to transmit signals in the horizontal polarization direction, switches 204 and 208 or open and switches 206 and 210 are closed. Therefore, in this mode signals pass from transmitter 220 through quarter wavelength transmission line 214 to the horizontal port 226 of antenna 202.

Figure 5:
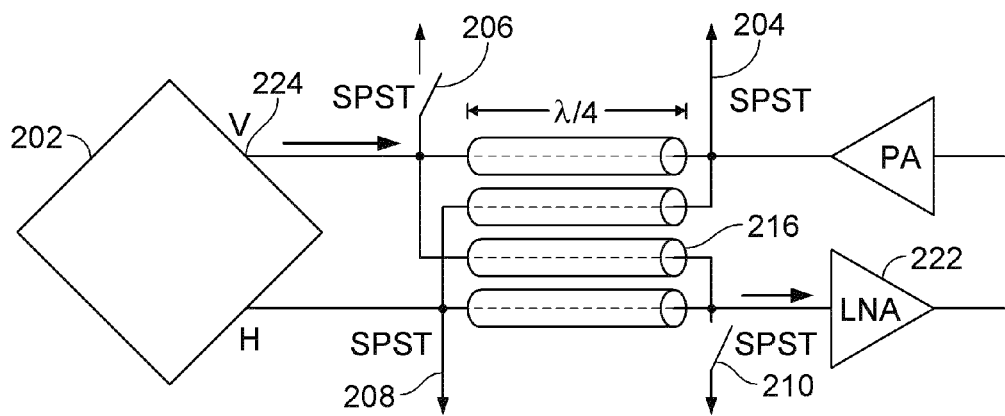
FIG. 5 is a block diagram of the switch of FIG. 2 being operated in a third mode.

In FIG. 5, to receive signals from the antenna positioned in the vertical polarized direction, switches 206 and 210 are open and switches 204 and 208 are closed. Therefore, the signals travel from the vertical port 224 of the antenna 202 to the receiver 222 via quarter wavelength transmission line 216.

Figure 6:
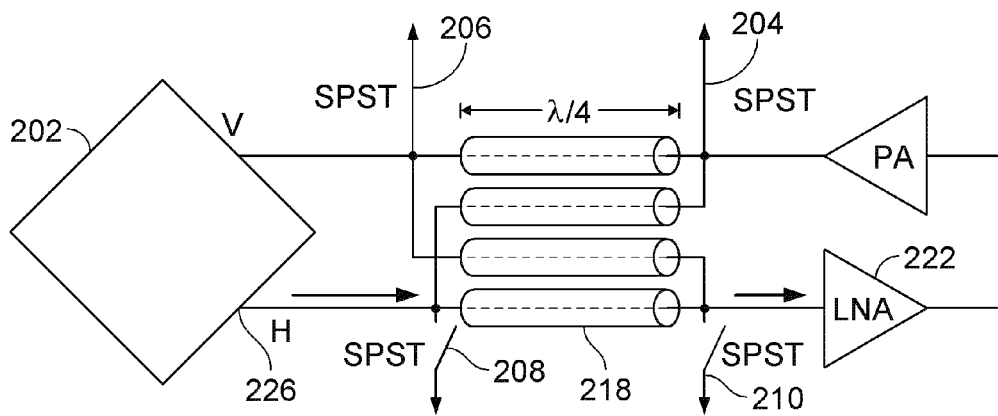
FIG. 6 is a block diagram of the switch of FIG. 2 being operated in a fourth mode.

In FIG. 6, switches 204 and 206 are closed and switches 208 and 210 are open to receive signals from the antenna operating in the horizontal polarized direction. The signals travel from the horizontal port 226 of antenna 202 and they are sent to the receiver 222 via quarter wavelength transmission line 218. The antenna 202 may be implemented as a single antenna that handles polarization diversity, may be implemented with two or more antennas of the same or different polarizations, and may be implemented as an antenna array.

Figure 7:
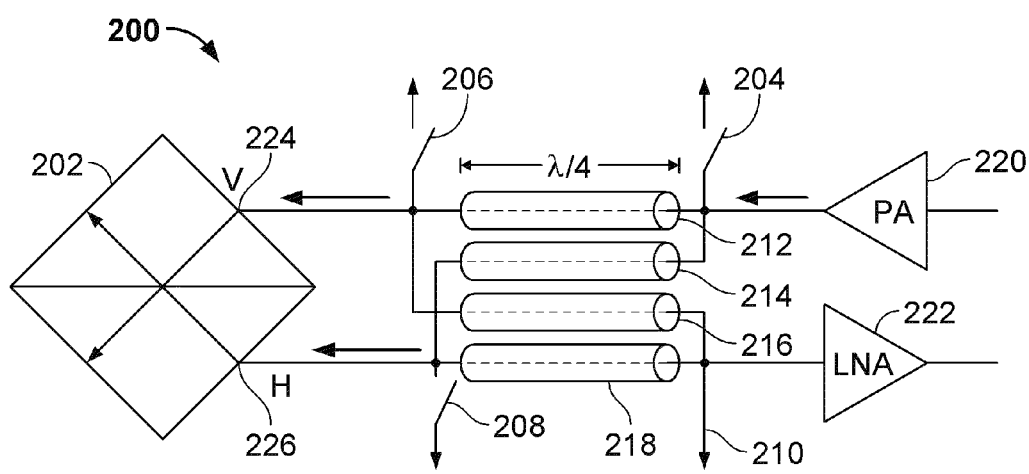
FIG. 7 is a block diagram of the switch of FIG. 2 being operated in a fifth mode for forty-five degree polarization.

FIG. 7 is a block diagram of the switch 200 of FIG. 2 being operated in a forty-five degree polarization mode. When switches 204, 206 and 208 are open and switch 210 is closed, there are two paths for the signal to travel. Therefore, half of the power of the signal travels to the vertical port 224 of antenna 202 and half of the power of the signal travels to the horizontal port 226. In this case, the vertical and horizontal polarizations are superposed to create a new polarization vector in between the vertical and the horizontal to produce polarization in the forty-five degree direction. Moreover, the switch 200 may be used to receive signals in the forty-five degree direction by opening switches 206, 208 and 210 and closing switch 204. Polarization directions other than vertical, horizontal and forty-five degrees may also be achieved, such as by adjusting the power levels to the vertical port 224 and horizontal port 226.

Figure 8:
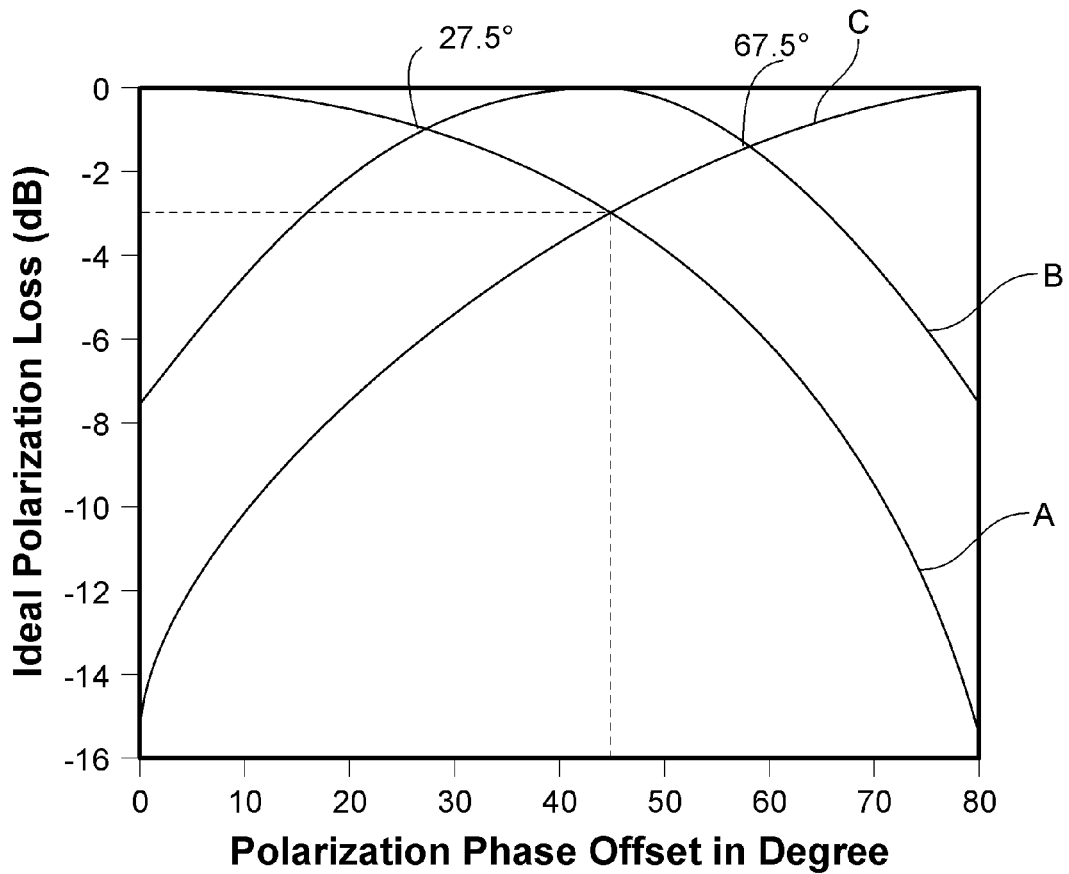
FIG. 8 is a graph showing exemplary loss caused by polarization mismatch for three modes of use: vertical, horizontal and forty-five degree polarization.

FIG. 8 is a graph that illustrates exemplary loss caused by polarization mismatch for three modes of use: vertical, horizontal and forty-five degree polarization. The millimeter-wave or 60 GHz band typically requires line of sight between transmitter and receiver, although the WirelessHD Specification Version 1.1, or others, may ameliorate this through the use of beam forming at the receiver and transmitter antennas to increase the signal's effective radiated power. A goal range for products may be in-room, point-to-point, and non-line-of-sight (NLOS) at up to 10 meters. An exemplary process for achieving a connection between devices is described in FIG. 26.

With linearly polarized antennas, a polarization loss factor may be calculated by $\Gamma = \cos^2(\Theta)$ where $\Theta$ is the angle between polarization vectors. If the polarization of the sending and target devices is aligned in the same direction, about zero loss in the power level of the signal may be achieved. The polarization offset is set for vertical polarization. Therefore, for line A polarization at zero degrees phase offset there is about zero power lost. At eighty degrees phase offset loss is about 16 dB. Superimposed onto the graph are polarization losses for forty-five degree polarization (line B) and horizontal polarization (line C). Therefore, for line B at forty-five degrees there is about zero power lost. In addition, for line C, at ninety degrees there is about zero power lost.

Since the switch 200 allows for antenna polarization to be changed on the fly, all of vertical, horizontal and forty-five degree polarization can be achieved. Taken together, as illustrated in the graph, the variety of polarization coverage may achieve at least about eighty-five percent power or better in any direction. Only about 2 dB or less ideal power loss occurs at the greatest loss angles, around the twenty-two and a half degree and sixty-seven and a half degree points on the graph. Without the switch, up to about a 16 dB reduction in power or more may occur if the polarizations of the transmitting and receiving devices are crossed or off by about ninety degrees.

Figure 9:
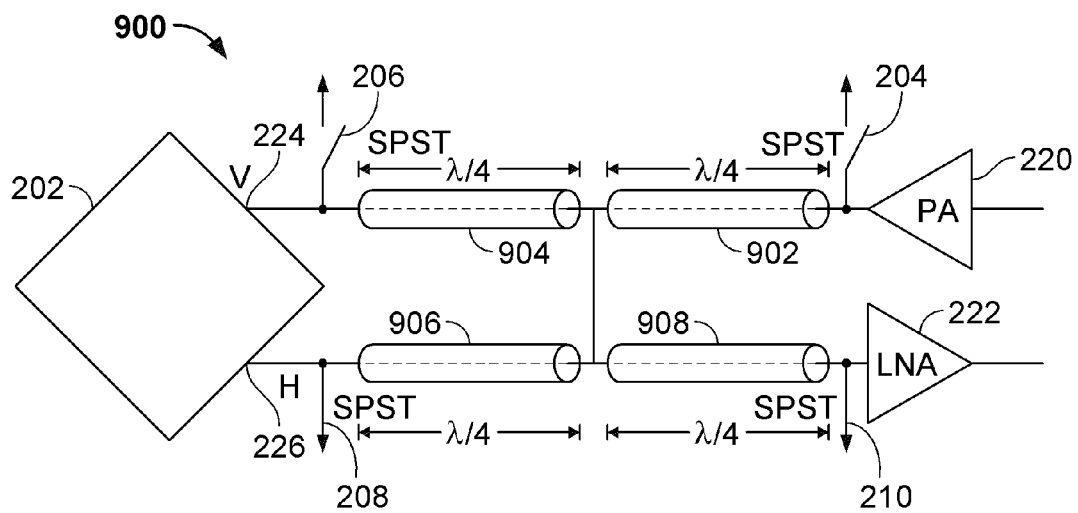
FIG. 9 is a block diagram of another example of a switch 900 for controlling polarization diversity and transmit/receive modes.

FIG. 9 is a block diagram of another example of a switch 900 for controlling both polarization diversity and transmit/receive modes. In this example, transmission lines 902, 904 and 906, 908 are connected in series while single-pole, single-throw switches 204, 206, 208, 210 connected in shunt. The transmission line my include quarter wavelength microstrip lines, such as any of those described herein. The transmission line loss portion of this switch 900 may be double as compared to examples with the transmissions lines positioned in shunt. The series configuration of the transmission lines 902, 904 and 906, 908 may be preferable if there is a need for additional routing between the transceiver and the antenna ports. The extra transmission lines used in the series configuration may provide for routing and connecting while performing as part of the double-pole, double-throw switch. Therefore, the series arranged transmission lines of switch 900 can provide polarization diversity and transmit/receive selection in one package.

FIGS. 10 through 15 are block diagrams of an exemplary balun switch 1000 for controlling polarization and transmit/receive modes. In these examples, the switch 1000 controls transmission of the signals via a transformer or balun 1002 and single-pole, single throw switches 204, 206, 208, 210. The balun double-pole, double-throw type switch may be preferable when there are constraints to a size of the double-pole, double-throw area or when operating at lower frequencies such as L-band and C-band, e.g., WIFI frequencies, etc.

Figure 10:
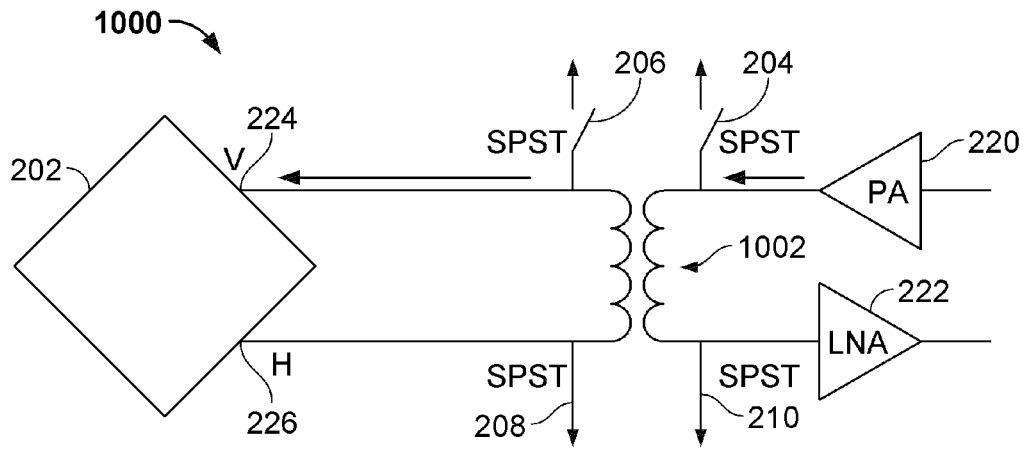
FIG. 10 is a block diagram of an exemplary balun switch for controlling polarization and transmit/receive in a first mode.
Figure 11:
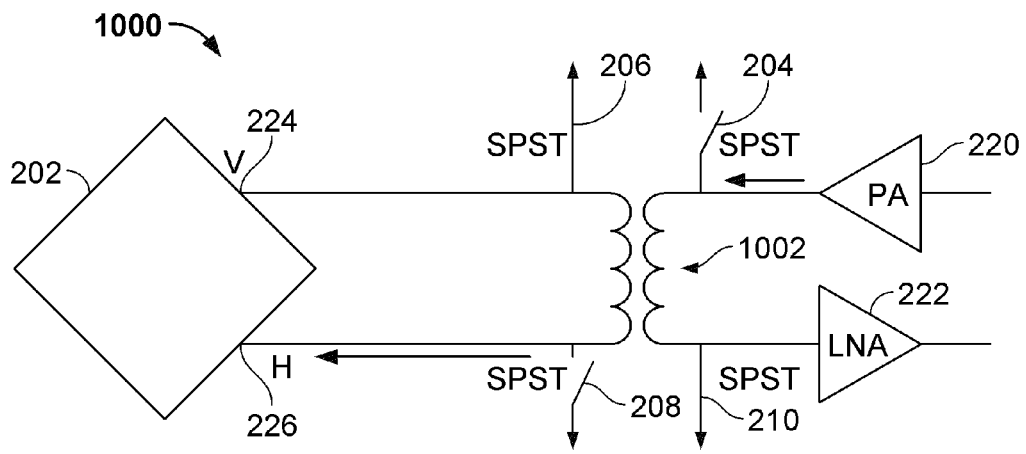
FIG. 11 is a block diagram of the switch of FIG. 10 being operated in a second mode.
Figure 12:
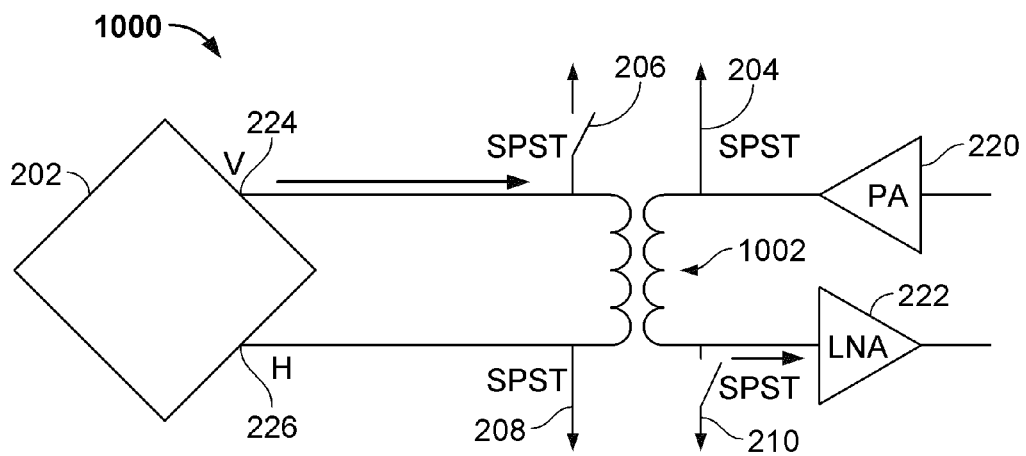
FIG. 12 is a block diagram of the switch of FIG. 10 being operated in a third mode.
Figure 13:
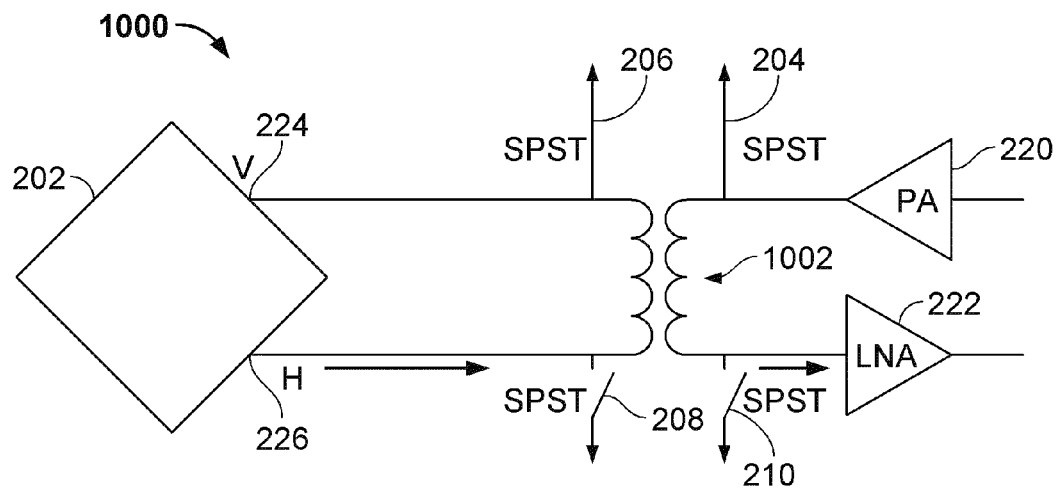
FIG. 13 is a block diagram of the switch of FIG. 10 being operated in a fourth mode.
Figure 14:
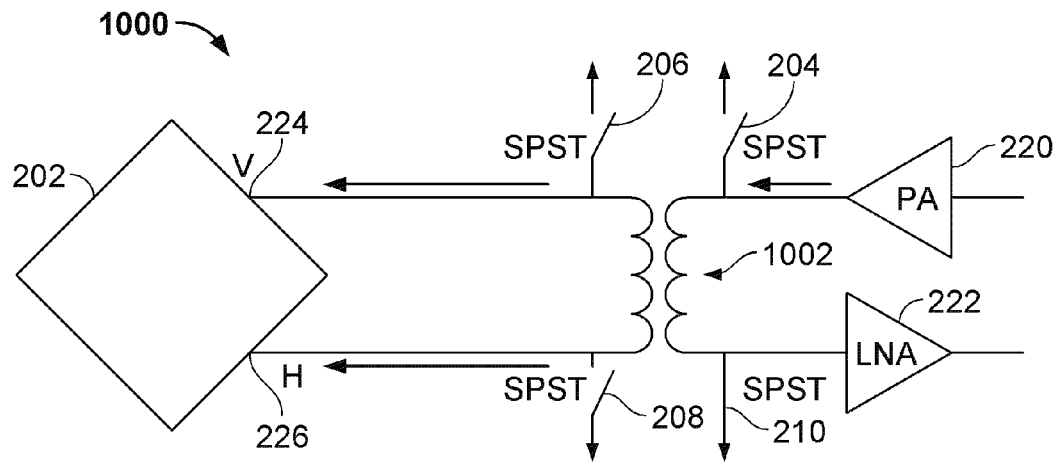
FIG. 14 is a block diagram of the switch of FIG. 10 being operated in a fifth mode.
Figure 15:
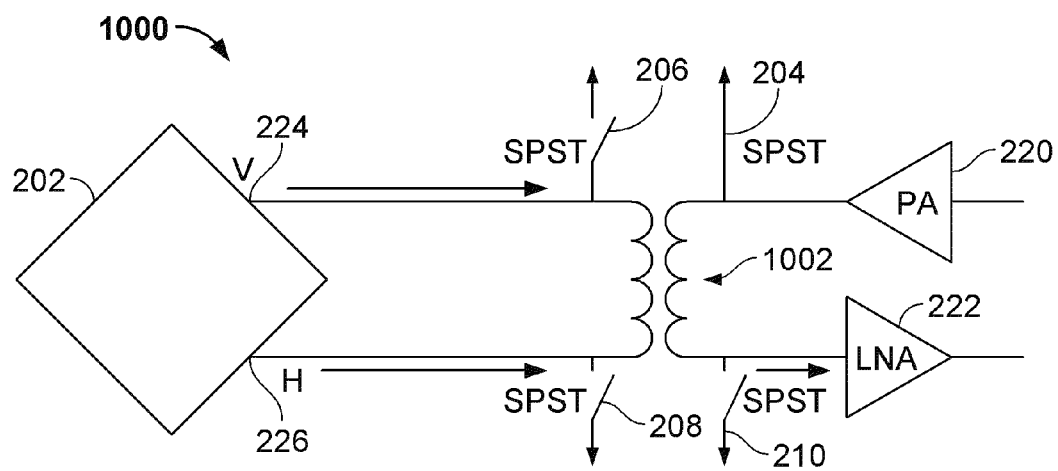
FIG. 15 is a block diagram of the switch of FIG. 10 being operated in a sixth mode.

The switch 1000 provides polarization diversity and transmit/receive selection in one package. In FIG. 10, switches 204 and 206 are open and switches 208 and 210 are closed. Therefore, the transceiver is operating in the transmit mode and has vertical polarization. In FIG. 11, switches 204 and 208 are open and switches 206 and 210 are closed. Therefore, the transceiver is operating in the transmit mode and has horizontal polarization. In FIG. 12, switches 206 and 210 are open and switches 204 and 208 are closed. Therefore, the transceiver is operating in the receive mode and has vertical polarization. In FIG. 13, switches 204 and 206 are closed and switches 208 and 210 are open. Therefore, the transceiver is operating in the receive mode and has horizontal polarization. In FIG. 14, switches 204, 206 and 208 are open and switch 210 is closed. Therefore, the transceiver is operating in the transmit mode and has forty-five degree polarization. In FIG. 15, switches 206, 208 and 210 are open and switch 204 is closed. The transceiver is operating in the receive mode and has forty-five degree polarization. The balun type switch 1000 in this configuration is able to provide polarization diversity and transmit/receive selection in one package, without the need for separate diversity and selection switches.

Figure 16:
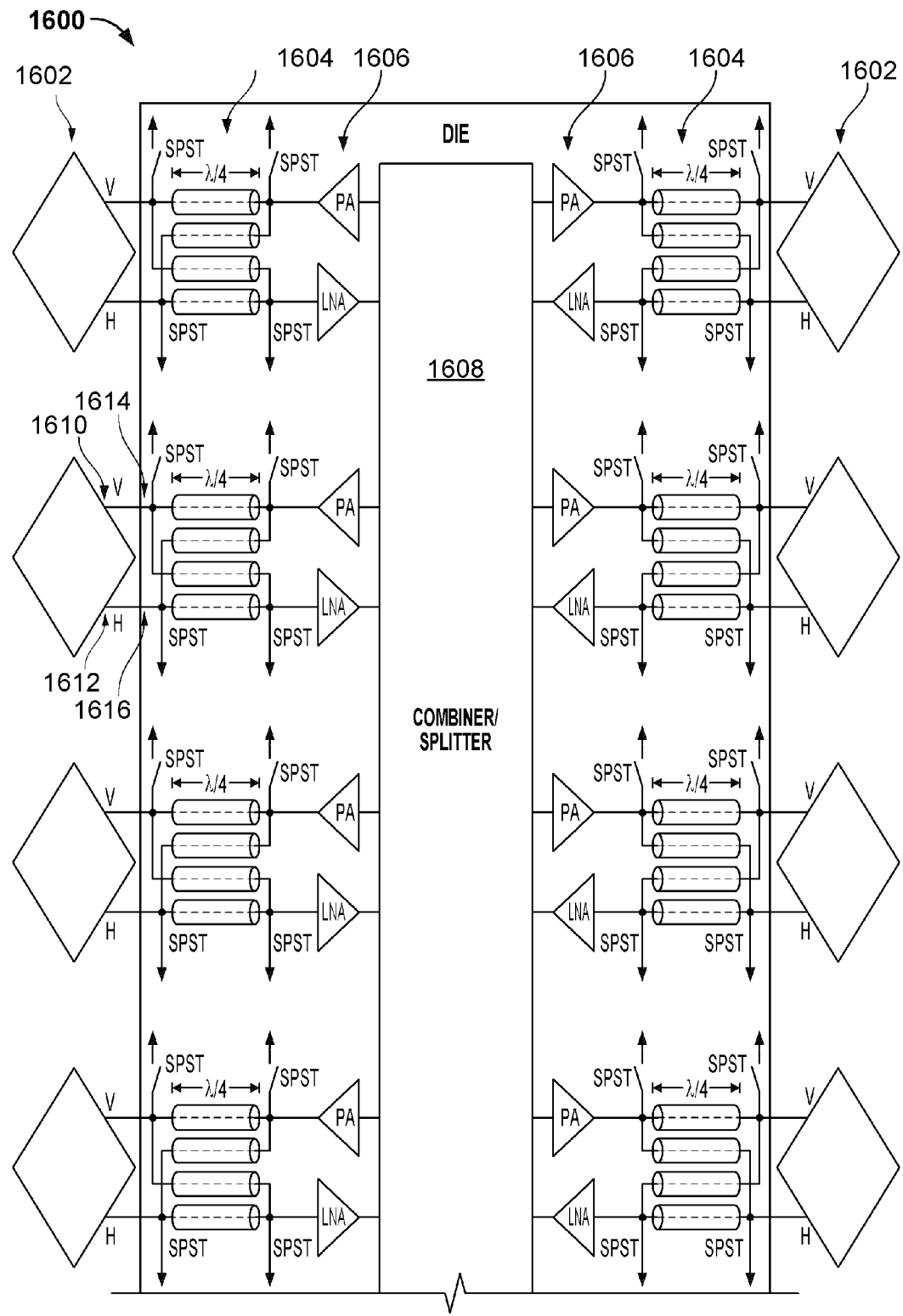
FIG. 16 is a block diagram of an implementation of an antenna array using any of the described switches.
Figure 16:
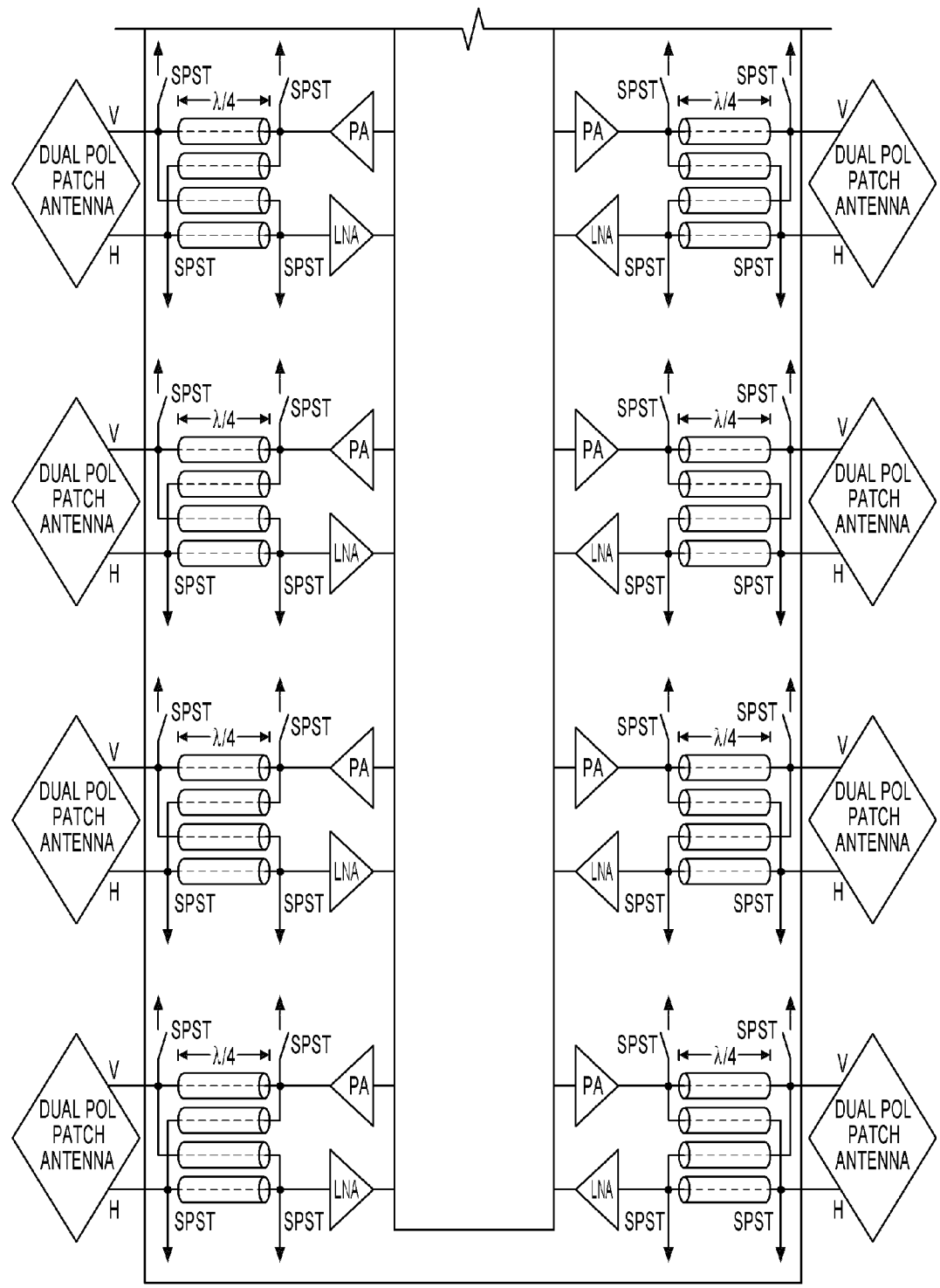

FIG. 16 is a block diagram of an implementation of an antenna array using any of the switches described herein, or other similar switches. The array may include components on a die 1600 connected with antennas 1602. The antenna 1602 may connect to the components on the die 1600 via transmission lines and switches 1604. Other components on the die 1600 include transmitters/receivers 1606 and a combiner/splitter 1608. The transmitters/receivers 1606 connect between the combiner/splitter 1608 and switches 1604. The switches 1604 may be implemented as double-pole, double-throw switches according to any of the arrangements described herein or other switches that provide for both diversity and mode selections. Quarter wavelength transmission lines of the switches 1604 may be implemented as microstrips on the die 1600. Sixteen sets of the transmitter/receiver 1606, transmission lines and switch 1604 and antenna 1602 combinations are illustrated, but other amounts may be used such as eight or thirty-two.

To accomplish polarization diversity, e.g., the ability to change the polarization direction of the antennas, the antennas 1602 may include dual-linearly polarized antennas, such that the polarization direction may be changed depending on which port 1610, 1612 of the antennas 1602 are excited, such as described herein with dual feed antennas. Each antenna 1602 may be individually controlled or some or all of the antennas in the array may be controlled together, in any determined number and arrangement. For example, all of the antennas 1602 may be controlled to be polarized in the same direction or some of the antennas 1602 may be polarized in one direction (e.g., vertical) and other antennas polarized in other directions (e.g. circular). Moreover, the antennas 1602 may be single polarized antenna, but antennas with different polarization are included in the array. The switches 1604 may be connected to the antennas 1602 so that port connects to a switch having a first polarization and the other port connects to an antenna 1602 having a different polarization. In that way, when horizontal polarization is required, the switches 1604 are operated so that only antennas having horizontal polarization are excited, and similarly for vertical, forty-five degree, circular, etc. polarization directions. In addition, the switches 1604 may control whether the transceiver is operating in transmit or receive mode, or both.

The combiner/splitter 1608 may combine signals when received, split signals for transmission, mix signals, up-convert signals, down-convert signals, etc. from/to the array of antennas 1602. In this example, sixteen antennas 1602 are shown to connect to the array, but other numbers of antennas may be used, such as two antenna per switch 1604. The antennas 1602 may be implemented together or separately from the die 1600. If the antennas 1602 are positioned separately from the die 1600, the array may include at least two metal routes to each antenna 1602 which correspond to the two ports 1614, 1616 of the switch 1604. The array may be used alone or together with other phased arrays. Such phased array may be a single polarization (e.g., diversity achieved by different arrays), may be dynamically adjustable (e.g., by controlling the polarization of each element), or a combination of the two.

Figure 17:
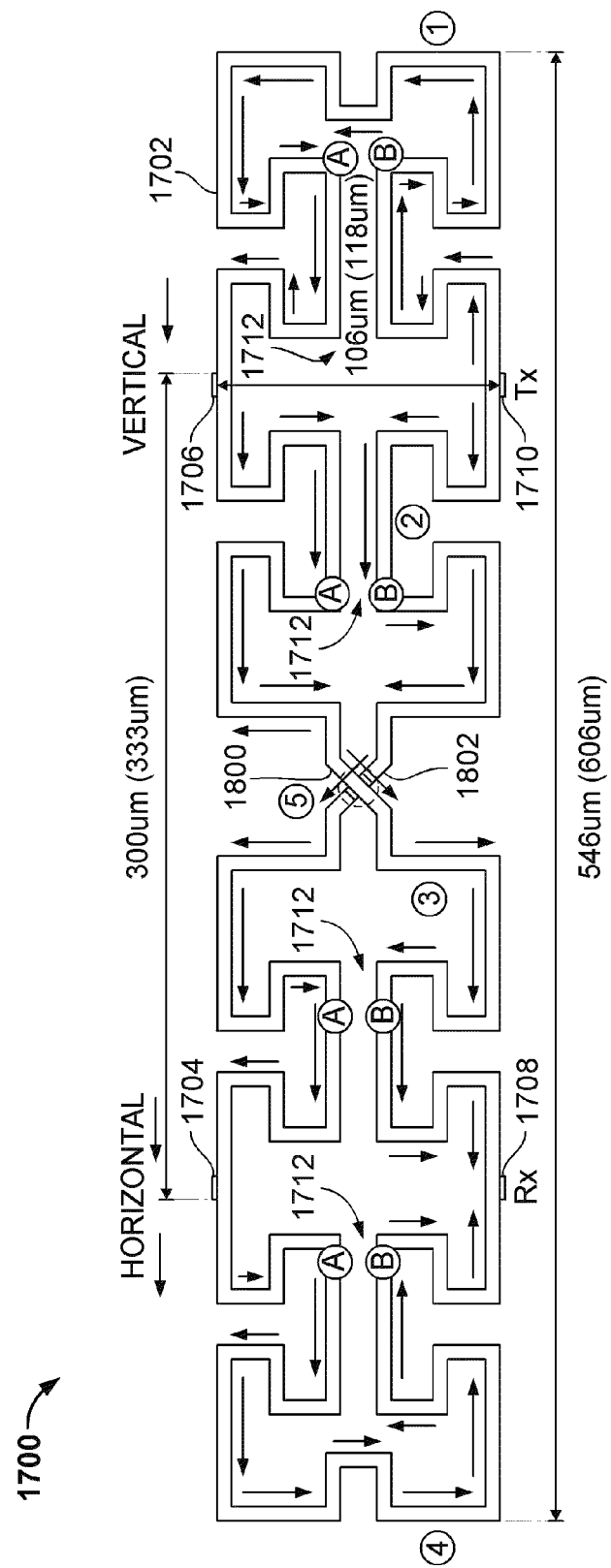
FIG. 17 is a block diagram of an exemplary on-chip double-pole, double-throw switch for polarization diversity and transceiver mode selection.

FIG. 17 is a block diagram of an exemplary on-microchip double-pole, double-throw switch 1700. The switch 1700 provides for polarization diversity and transmit/receive mode selection. In one example, the switch 1700 may be designed in the 40-nano silicon process with an ultra-thick metal stack (UTM) option. Quarter-wavelength transmission lines 1702 are provided on the die using micro-strip lines to connect with a horizontal port 1704 and a vertical port 1706 of an antenna (or to connect to two antenna having different polarizations), and a transmitter port 1708 and a receiver port 1710 of the transceiver. To reduce a footprint, the micro-strip lines include bends to change direction and meander around the chip, such as in the pattern shown. An overlay of the switch 1700 is about 546 μm to 606 μm long, about 106 μm to 118 μm wide, and about 300 μm to 333 μm from vertical to horizontal and transmitter to receiver ports.

Figure 19:
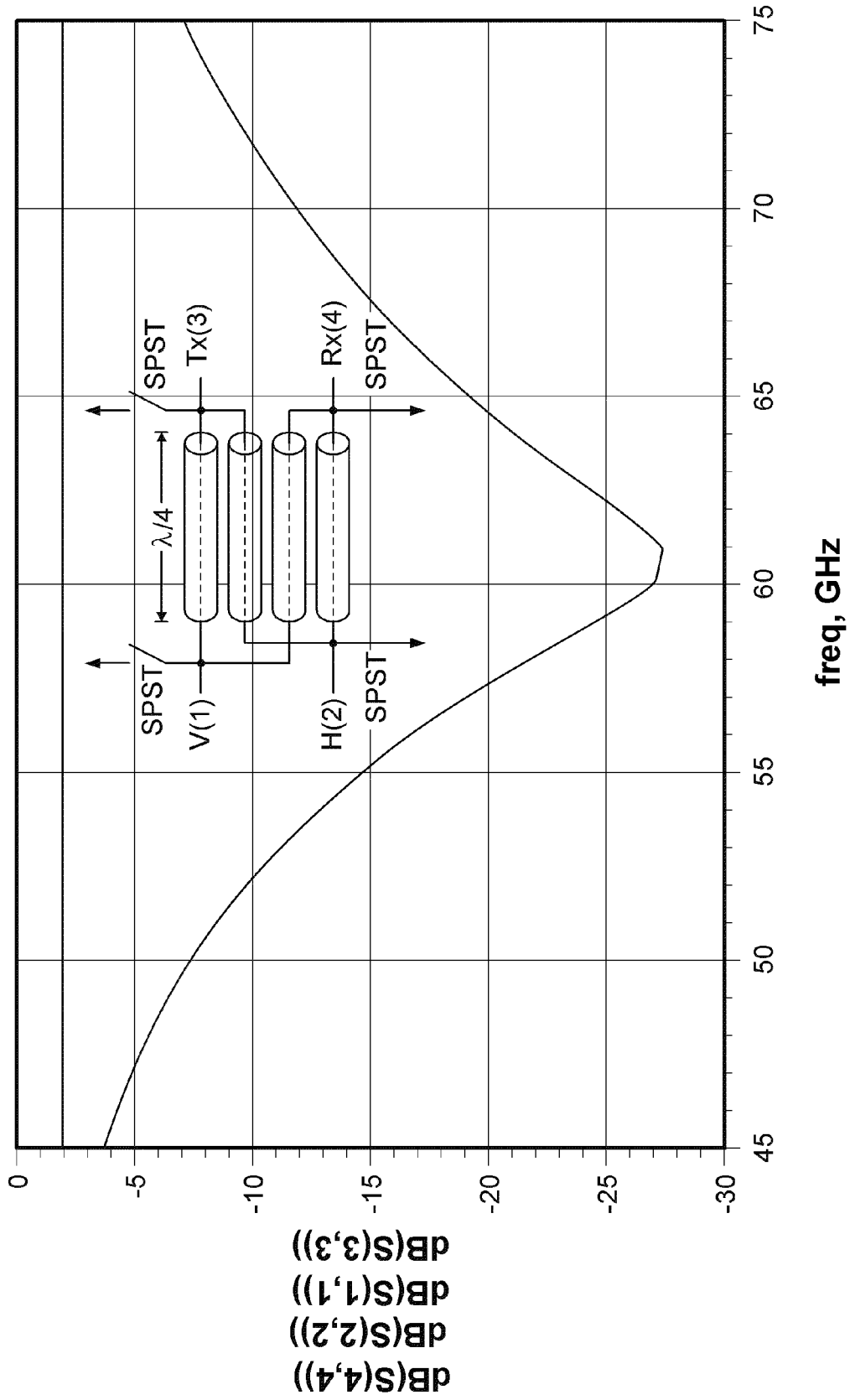
FIG. 19 is a graph showing an exemplary return loss of a double-pole, double-throw switch for polarization diversity and transmit/receive mode selection.
Figure 20:
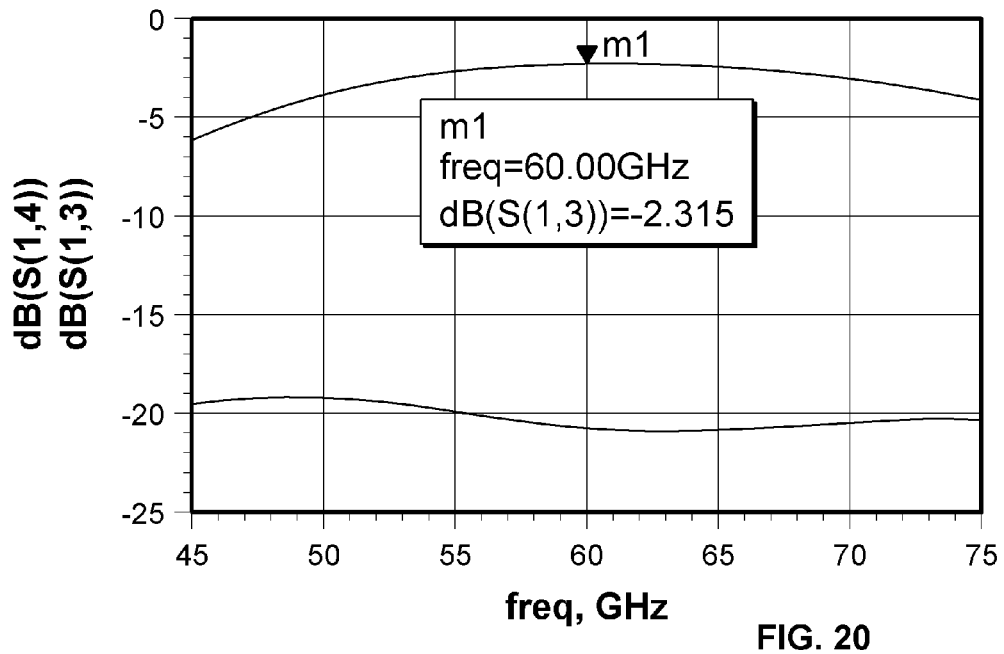
FIG. 20 is a graph showing an exemplary insertion loss and isolation of a double-pole, double-throw switch for polarization diversity and transceiver mode selection.

The illustrated pattern is very compact while maintaining low loss and high isolation. In each mode of operation (e.g. transmit mode to vertical antenna, transmit mode to horizontal antenna, receive mode from vertical antenna and receive mode from horizontal antenna) the insertion loss of the direct path to the selected antenna polarization port is about 2.3 dB at 60 GHz (e.g. broadband), as discussed in FIGS. 19 and 20. At the same time the isolation to the other antenna port with opposite polarity is about 20 dB. In the transmit mode with vertical antenna polarization, the TX (e.g., transmit) port to the vertical antenna port insertion loss is around 2.3 dB and RX (e.g. receive) port to the horizontal antenna isolation is around 20 dB at 60 GHz, as shown in FIGS. 19 and 20.

The micro-strip pattern may include four separate lines, marked 1-4. The micro-strips cross paths at the section marked 5, shown in more detail in FIG. 18. Signals flow from the transmitter to the vertical port (e.g., along path 1), the transmitter to the horizontal port (e.g., along path 2), the vertical port to the receiver (e.g. along path 3) or the horizontal port to the receiver (e.g., along path 4). There are four sets of corresponding generally 'T' shaped lines 1712. More or less 'T' shaped lines may be used depending on an implementation. Too many 'T' shaped lines or too many bends in the overlay may cause an undesirably high insertion loss, and too few 'T' shaped lines may not provide sufficient isolation between the lines.

With this layout, the currents run counter to each other. In other words, at the transmitter port 1710 current flows in a first direction from the transmitter port 1710 to the vertical port 1706, and flows in a different direction from the transmitter port 1706 to the horizontal port 1704. Likewise, at the receiver port 1708 current flows in a first direction to the receiver port 1708 from the vertical port 1706, and flows in a different direction to the receiver port 1708 from the horizontal port 1704. These counter running currents help provide for good isolation between the transmitter port 1710 and the receiver port 1708.

In addition, a determined length of adjacent 'T' shaped lines provides for weak coupling, which provides for good isolation between the transmitter port 1710 and the receiver port 1708. Stray signals at the receiver are undesired in transmitter mode, and vice versa. When the micro-strip lines are positioned next to each other, such as at line segments A and B of the generally 'T' shaped lines 1712, a length of the lines is sized such that the edge coupling is weak. The 'T' shaped lines 1712 are sized, for example, at less than lambda/10 to minimize coupling, where lambda is the wavelength. With such dimensions, this architecture may behave like a resonant coupler at frequencies much higher than the operating frequencies. Therefore, coupling frequencies do not affect the 60 GHz transmitter/receiver to cause unwanted noise.

An advantage of this pattern includes package size reduction due to antenna, transmitter and receiver connections sharing the same on-chip structure. In addition, an on-chip transceiver feedback loop for calibration may be realized through the switch. For example, the feedback loop may be realized if all the switches operate in OFF mode. In this scenario the signal from the TX may be fed to one of the antenna polarization ports and may arrive at the other antenna polarization port. The signal may be weakened depending on an amount of isolation between antenna polarization ports. The arrived signal at the antenna may be fed to the receiver to form a closed loop. The polarization diversity can help to maximize the received power in a millimeter-wave wireless link. Also, low insertion loss and high port to port isolation can make the architecture a good candidate for a phased array transceiver, such as the array discussed in FIG. 16.

Figure 18:
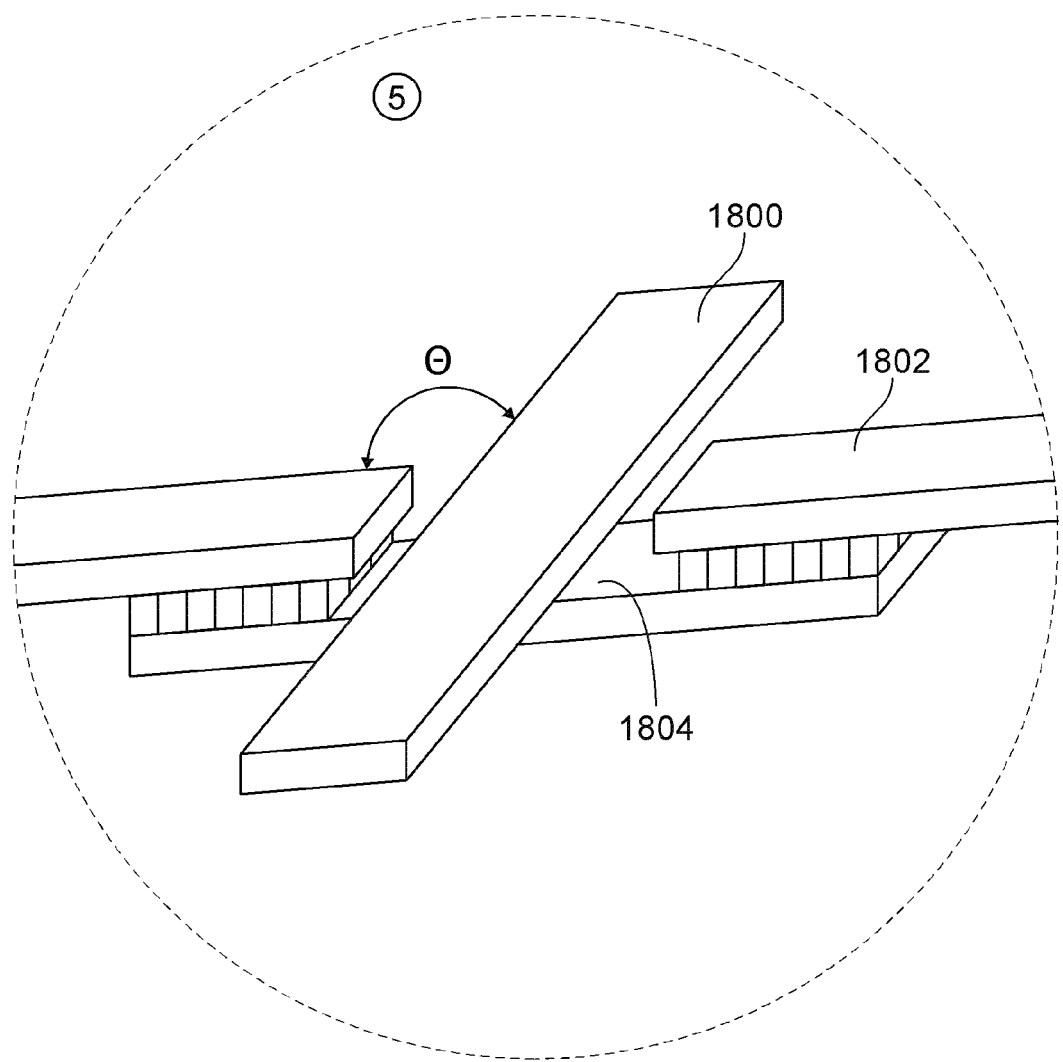
FIG. 18 is a block diagram of an exploded view of an exemplary cross-over section of micro-strip lines of the switch of FIG. 17.

FIG. 18 is a block diagram of an exploded view of the cross-over section (5) of the micro-strip lines 1800, 1802 of switch 1700, also shown in FIG. 17. In addition to the counter running currents and the length of adjacent micro-strip lines discussed above, the cross-over section (5) contributes to the low coupling (e.g., high isolation) of the switch 1700. The first micro-strip line 1800 and the second micro-strip line 1802 cross each other at an angle Θ of about ninety degrees. The second micro-strip line 1802 attaches to another metal micro-strip layer 1804 positioned in a different plane so that micro-strip line 1800 may cross over or under it. In addition, the first micro-strip line 1800 and the second micro-strip line 1802 are straight lines at the cross-over portion. The coupling at the cross-over section (5) is about 30 dB.

FIG. 19 is a graph showing an exemplary return loss of the double-pole, double-throw switch for polarization diversity and transceiver mode selection. The return loss is the ratio of signal power transmitted into a system to the power reflected or returned. At the 60 GHz band (e.g., 52 GHz to 72 GHz), return loss is about 10 dB or better. The return loss is about 2 dB for the switches that are on (e.g., connected to ground).

FIG. 20 is a graph showing an exemplary insertion loss and isolation of the double-pole, double-throw switch for polarization diversity and transceiver mode selection. The insertion loss is a measure of the attenuation of the switch by determining the output of a system before and after the switch is inserted into the system. Isolation is the ability to keep signals at the horizontal, vertical, transmit and receive ports separate from each other. At 60 GHz the insertion loss is only about 2.3 dB and the isolation is more than about 20 dB from the horizontal port to the receiver port, and from the vertical port to the transmitter port, and about 40 dB from the horizontal port to the vertical port and from the receiver port to the transmitter port.

Figure 21:
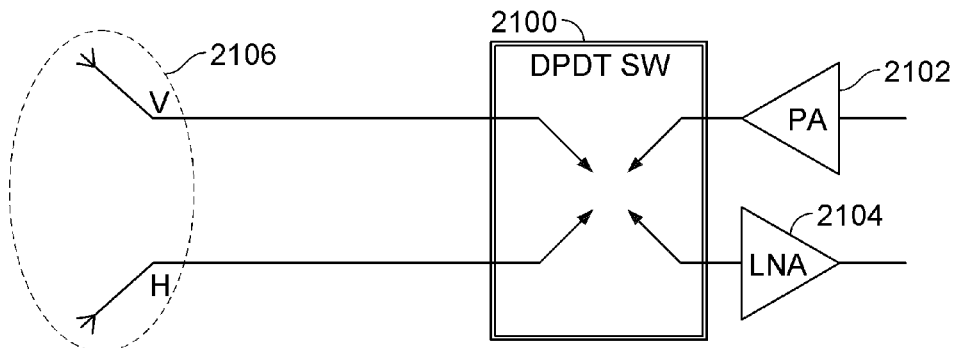
FIG. 21 is a block diagram of another exemplary circuit to implement the double-pole, double-throw switching to control polarization and transmit/receive modes.
Figure 22:
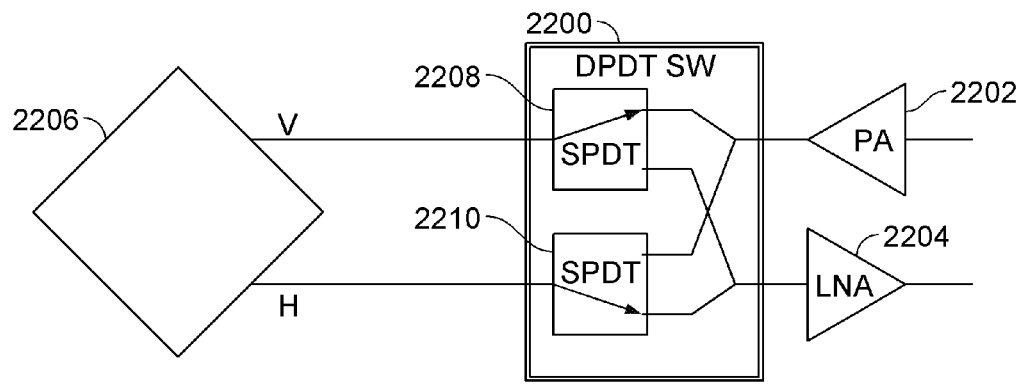
FIG. 22 is a block diagram of another exemplary circuit to implement the double-pole, double-throw switching to control polarization and transmit/receive modes.
Figure 23:
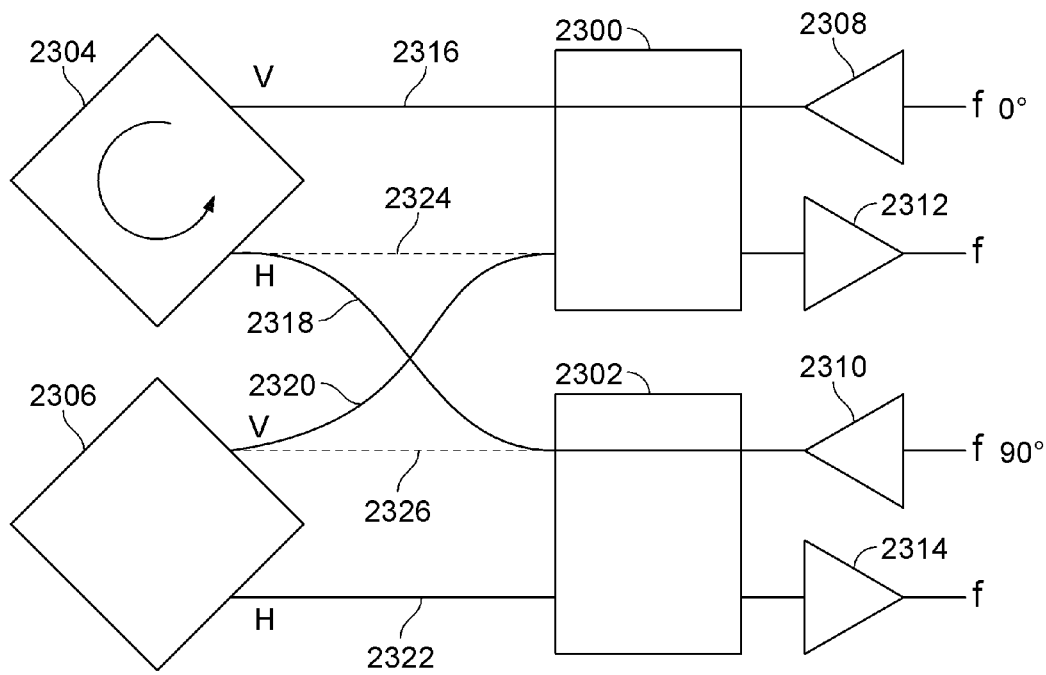
FIG. 23 is a block diagram of an exemplary circuit to implement the double-pole, double-throw switching to control circular polarization and transmit/receive modes.

FIGS. 21 through 23 are block diagrams of other circuitry that may be used to implement double-pole, double-throw switching to control polarization and transmit/receive modes. Additional or alternative configurations may also be used. In FIG. 21, a double-pole, double-throw switch 2100 connects a transmitter 2102 and a receiver 2104 to a dual polarization antenna 2106. The antenna 2106 may be placed on-chip with the switch 2100, transmitter 2102, and receiver 2104, or off-chip. The antenna 2106 may be implemented as a micro-strip or patch antenna, or other type of antenna, such as a whip antenna, ground plane antenna, dipole antenna, discone antenna, mast radiator, horizontal loop antenna, and halo antenna. Alternatively or in addition, two antennas having different polarizations may be used instead of one dual polarization antenna. The switch 2100 may excite the vertical polarization port V or the horizontal port H, or excite a vertical polarized antenna or a horizontal polarized antenna, depending upon an implementation. In addition, the switch 2100 may operate the circuit in transmit and receive modes for the vertical and the horizontal polarizations.

In FIG. 22, the circuit includes a double-pole, double-throw switch 2200 connecting a transmitter 2202 and a receiver 2204 to an antenna 2206. The antenna 2206 may include a patch antenna or another type of antenna. In this example, the double-pole, double-throw switch is provided by two single-pole, single throw switches 2208, 2210 to accomplish the switching. The switches 2208, 2210 control whether the circuit is operating in vertical or horizontal polarization modes (or another polarization mode), and whether the circuit is transmitting or receiving signals. If the power amplifier is OFF and low noise amplifier is ON, the mode of operation is RX to the horizontal-polarization. If the power amplifier is ON and the low noise amplifier is OFF, the mode of operation is TX to vertical-polarization.

In FIG. 23, a way to achieve circular (e.g., right hand or left hand) polarization is to connect a pair of double-pole, double-throw switches 2300, 2302 to a pair of antennas 2304, 2306, and excite vertical and horizontal ports of the same antenna 2304 or 2306 at the same time but with the signals being at a different phase. Line 2316 connects transmitter 2308 with the vertical polarization port V of antenna 2304, and line 2318 connects transmitter 2310 with the horizontal polarization port H of the same antenna 2304. In addition, line 2320 connects receiver 2312 with the vertical polarization port V of antenna 2306, and line 2322 connects receiver 2314 with the horizontal polarization port H of the same antenna 2306.

Which lines are excited is controlled by the pair of double-pole, double-throw switches 2300, 2302. In the illustrated mode, transmitter 2308 is connected with the vertical port of antenna 2304 and transmitter 2310 is connected with the horizontal port of antenna 2304 and their phases are ninety degrees apart. This creates a transmitted signal with circular polarization in antenna 2304. The switches 2300, 2302 and antennas 2304, 2306 may also be used for linear polarization, such as in the vertical and horizontal directions as described above, with the addition of lines 2324 and 2326.

Figure 24:
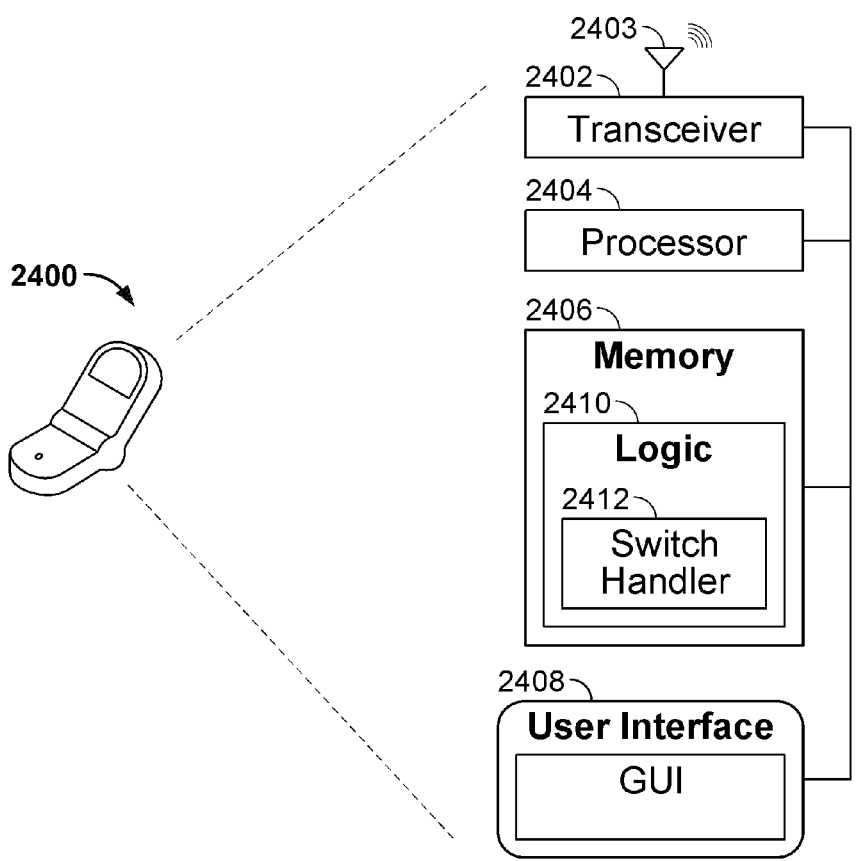
FIG. 24 shows an example of an endpoint, in this instance a smartphone, which may implement any and all of the described switches.

FIG. 24 is a block diagram of an exemplary endpoint 2400, in this instance a smartphone that may use any and all of the switches described herein and similar switches. The endpoint 2400 includes a transceiver 2402 (e.g., transmitter, receiver, double-pole, double-throw switches), an antenna 2403 (e.g., dual polarization antenna), one or more computer processors 2404, a memory 2406, and a user interface 2408. The transceiver 2402 may be wireless transceiver, and the transmitted and received signals may adhere to any of a diverse array of formats, protocols, modulations, frequency channels, bit rates, and encodings that presently or in the future may be supported. Thus, the transceiver 2402 may support the 802.15.3, 802.15.4, the 60 GHz WLAN or WPAN specification, Bluetooth, Global System for Mobile communications (GSM), Time Division Multiple Access (TDMA), Frequency Division Multiple Access (FDMA), Code Division Multiple Access (CDMA), or other wireless access techniques or protocols.

The processor 2404 executes the logic 2410. The logic 2410 may be an operating system, application program, firmware, or other logic. The logic 2410 includes a switch handler 2412 (or other response logic for handling switching). The switch handler 2412 may implement processing with respect to determination of a polarization direction and whether the endpoint 2400 is operating in sending and/or receiving mode. For example, the switch handler 2412 may determine which polarization direction to select to match the polarization of a connecting device, such as described in FIG. 26.

Figure 25:
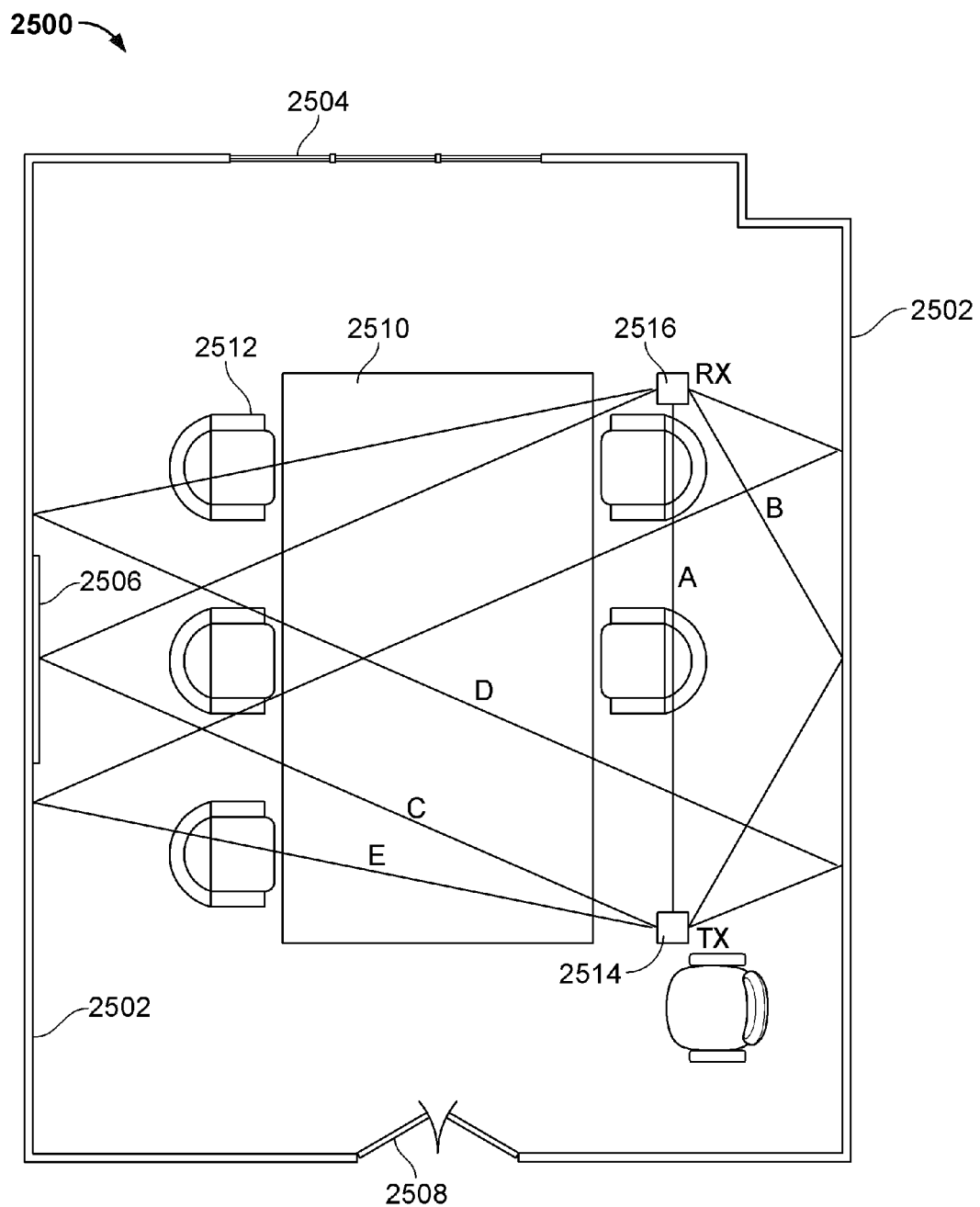
FIG. 25 is a block diagram of an exemplary environment in which endpoints, such as the smartphone endpoint, including any and all of the switches described herein may operate.

FIG. 25 is a block diagram of an environment 2500 in which endpoints, such as smartphone endpoint 2400, including the switches for controlling polarization and transmit/receive mode described herein may operate. The environment 2500 may include a conference room that includes objects that reflect communication signals. The objects include walls 2502 (including ceiling and floor), windows 2504, white boards 2506, doors 2508, tables 2510 and chairs 2512. For purposes of explanation, the endpoints are located at transmitting point 2514 and receiving point 2516. In a different mode, the transmitting point 2514 may also receive signals and the receiving point 2516 may also transmit signals. Exemplary signal propagation paths include line-of-site path A between the transmitting point 2514 and receiving point 2516, reflection off a near wall path B before the signal reaches receiving point 2516 and reflection off a far wall path C (e.g. first order reflection off white board 2506), and reflection off the near wall and then the far wall path D and reflection off the far wall and then the near wall path E (e.g., second order reflections). Other propagation paths may also exist.

Therefore, communication signals or other signals or messages sent between a user's device, such as a smartphone, and anther device, such as a printer, may take multiple paths before reaching their destination such as when the user is attempting to print from the smartphone to the printer. Exemplary average signal-to-noise (SNR) degradation is illustrated in the following Table for different antenna polarization characteristics and different types of clusters. For the linear cross-polarized antennas, these values may be underestimated because many clusters are not identified in the measurements for this configuration (e.g. received power is below the noise level). In these cases the signal-to-noise ratio was set to 0 dB. Since the actual signal-to-noise ratio is less than zero, the degradation may be larger.

TABLE 1

| ANETNNA CONFIGURATION | Average degradation dB | | | |
|---|---|---|---|---|
| | LOS Clusters | 1" order Reflections | 2" order Reflections | All Clusters |
| Circular co-polarized antennas | 0.3 | 5.7 | 0.7 | 3.0 |
| Circular cross-polarized antennas | 17.0 | 0.9 | 5.3 | 5.2 |
| Circular and linear polarized antennas | 2.9 | 2.3 | 2.4 | 2.4 |
| Linear co-polarized antennas | 0.2 | 1.4 | 0.5 | 0.9 |
| Linear cross-polarized antennas | 18.8 | 12.0 | 7.4 | 11.6 |

As shown in the Table, co-polarized transmitting and receiving devices may be important to maintaining a connection.

Figure 26:
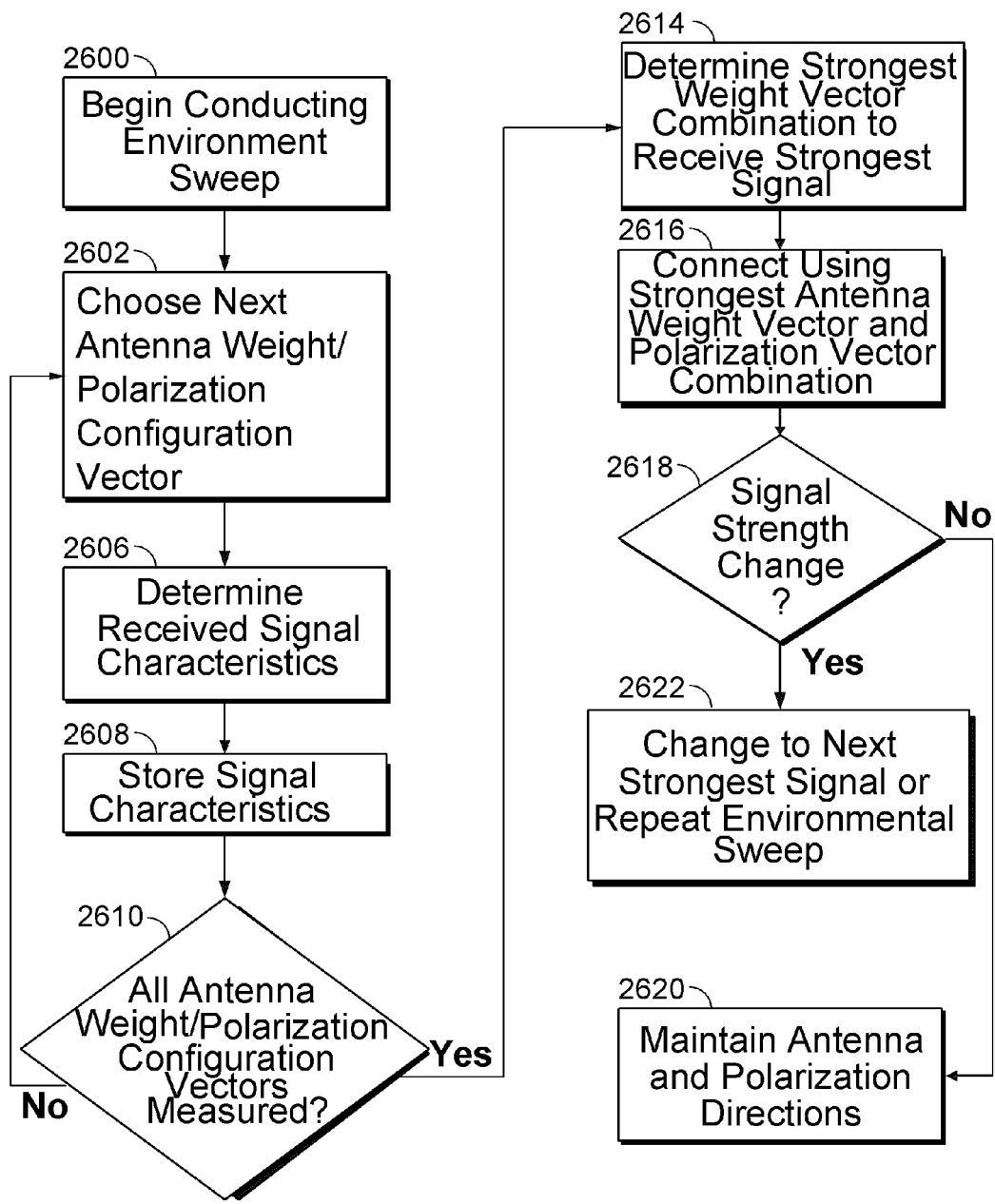
FIG. 26 is a flowchart illustrating an exemplary process for connecting endpoints.

FIG. 26 is a flowchart illustrating a process or a search algorithm for connecting endpoints, such as the smartphone endpoint 2400 and printer in the environment 2500 of FIG. 25. The process aligns a communication link between two endpoints. One or both of the connecting endpoints may provide millimeter wave or 60 gHz devices which include double-pole, double-throw switches described herein for controlling polarization and transceiver modes, or a similar switch. For example, the switches may be configured to enable the selection of transmit/receive modes and vertical, horizontal, forty-five degree, circular, etc. polarization. Each antenna in an array of antennas can also be independently programmable.

In one example, the switching is used to conduct a spatial search or sweep of the environment 2500. In general, at the time of orienting an antenna transmission angle, the polarization directions are also oriented for each antenna angle to try to discover the antenna angles and polarization directions at each antenna angle that provide for the least degradation of signals travelling between endpoints. At block 2600, logic 2410 of the smartphone 2400 begins conducting a sweep of the environment 2500 to search for signals transmitted from other 60 GHz devices, such as the printer in the above example. Signals between the smartphone 2400 and printer may take different paths A-E before reaching each other.

At block 2602, each antenna, e.g. omnidirectional antenna, in the array can be oriented at a first determined angle of a plurality of angles. Received signal characteristics for the given array setting can be measured. The orientation of each antenna in the array may be controlled electrically such that the power beam of the antenna array may be pointed in different directions. At block 2602, a set of antenna angles and polarization settings is chosen from a set of angles and polarizations. At blocks 2606 and 2608 the received signal characteristics which may include received signal strength (RSSI), signal-to-noise ratio and channel estimate is determined and stored. At block 2610, it can be determined if all the antenna weights and polarization settings from the chosen set have been measured. If not all have been measured the antenna array is programmed with the next angle and polarization vectors until all the antenna angles and polarization vectors have been measured.

At block 2614 the measurements for each combination of antenna angle setting and polarization can be used to determine the combination of antenna angle and polarization of each antenna in the array that gives the strongest received signal or signal-to-noise ratio. At least one next combination with lower received signal strength or signal to noise ratio can also be determined. At block 2616, a connection may be made between the endpoints, for example using the strongest antenna weight vector and polarization vector combination. At block 2618, a change in the signal strength may be monitored.

If the received signal strength or signal-to-noise ratio stays high, e.g. a strong signal or signal above a threshold, the antenna array configuration is maintained at block 2620. Otherwise, at block 2622 the second set or other sets of combinations may be tried or the environmental sweep is carried out once again to find the next set of strong signals. The threshold may be determined in that a connection between endpoints is maintained.

In one example, a communication link is aligned between two endpoints, such as a smartphone sending a print request to a printer. A transmission or reception angle and polarization direction of each antenna is oriented within the antenna array of at least one of the two endpoints. A communication signal is received with the antenna array. The signal characteristics of the communication signal are measured and recorded for the configured antenna array. The transmission or reception angle is then changed and polarization directions are changed for each transmission angle. The signal strength is re-measured and re-recorded for each transmission angle and each polarization direction. Strongest signal antenna array settings are determined based on the recorded signal characteristics. The transmission angle and polarization direction of each antenna can be set in the array in accordance with the determined strongest signal strength.

The signal strength at the set transmission angle and polarization direction can be monitored for any changes, such as in this example during the print operation when print information is being sent from/to the smartphone and printer. The set transmission angle and polarization direction can be changed to a transmission angle and polarization direction having the next strongest signal strength when the strongest signal strength becomes degraded. The signal strength at the set transmission angle and polarization direction can be monitored for any changes. Since one or more of the endpoints may change positions or orientations, or the environment may change, during the communication, the alignment operation can be reinitiated to find updated antenna array settings to receive strongest signals.

In view of the above detailed description and associated drawings, it should also be apparent that such other modifications and variations may be effected without departing from the spirit and scope of the invention. The FCC and various regulators over the world have allowed the limits on transmit power and the Equivalent Isotropic Radiated Power (EIRP) to ensure the wireless transmission in the 60 GHz band. Thus, the large unlicensed bandwidth associated with a high allowable transmit power can enable multi-gigabit wireless communications. The millimeter wave band has several other advantages. In addition to the large spectral capacity, it may offer small antennas, and compact and light equipment. Moreover, at 60 GHz operating frequency, the beam width is only equal to a few degrees and for WPAN applications an omnidirectional antenna pattern is usually desired. A whole range of applications in the area of consumer electronics devices may utilize this band for high data rate wireless applications. From uncompressed video distribution in the home, fast downloads of Gbytes of data at video kiosks, to Gbit/s wireless connections between laptops and printers.

The methods, devices, and logic described herein may be implemented in many different ways in many different combinations of hardware, software or both hardware and software. For example, all or parts of the endpoint 2400 may include circuitry in a controller, a microprocessor, or an application specific integrated circuit (ASIC), or may be implemented with discrete logic or components, or a combination of other types of circuitry. All or part of the logic may be implemented as instructions for execution by a processor, controller, or other processing device and may be stored in a machine-readable or computer-readable medium such as flash memory, random access memory (RAM) or read only memory (ROM), flash memory, erasable programmable read only memory (EPROM) or other machine-readable medium such as a compact disc read only memory (CDROM), or magnetic or optical disk.

While various embodiments of the invention have been described, it will be apparent that many more embodiments and implementations are possible within the scope of the invention. Accordingly, the invention is not to be restricted except in light of the attached claims and their equivalents.

What is claimed is:

1. A transceiver circuit, comprising:
    a transmitter configured to send communication signals;
    a receiver configured to receive communication signals sent by other transmitters; and
    a first switch configured to couple the transmitter and the receiver to an antenna, the first switch to control at least two directions of polarization of the antenna, the first switch comprising four single-pole, single-throw switches coupled in shunt to one another, the four single-pole, single-throw switches configured to operate as a double-pole, double-throw switch.

2. The circuit of claim 1, wherein the first switch is configured to control a transmit mode and a receive mode of the transceiver circuit in addition to the at least two directions of polarization.

3. The circuit of claim 1, wherein the at least two directions of polarization comprise a vertical direction, a horizontal direction, and a forty-five degree direction.

4. The circuit of claim 1, further comprising four quarter-wavelength transmission lines coupled in shunt to the four single-pole, single-throw switches.

5. The circuit of claim 1, wherein a first port of the double-pole, double-throw switch is coupled to the transmitter, a second port of the double-pole, double-throw switch is coupled to the receiver, a third port of the double-pole, double-throw switch is coupled to a vertical polarization port of the at least one antenna, and a fourth port of the double-pole, double-throw switch is coupled to a horizontal polarization port of the at least one antenna, wherein the double-pole, double throw switch is configured to control polarization, transmit mode and receive mode.

6. The circuit of claim 1, further comprising a transformer coupled to the four single-pole, single-throw switches.

7. The circuit of claim 1, wherein the circuit comprises a micro-millimeter wave circuit.

8. The circuit of claim 1, wherein the at least one antenna comprises a first antenna having a polarization in a first direction and a second antenna having a polarization in a second direction different than the first direction.

9. The circuit of claim 8, wherein the first switch is configured to control excitation of the first antenna and excitation of the second antenna.

10. The transceiver circuit of claim 1, where the switch further comprises a quarter wavelength micro-strip line.

11. A switch, comprising:
    transmission line configured to couple an antenna to a transceiver, the transmission line comprising:
        a first transmission line configured to couple transmitter port to a first antenna port;

a second transmission line configured to couple the transmitter port to a second antenna port;

a third transmission line separate from the first transmission line, the third transmission line configured to couple a receiver port to the first antenna port; and a fourth transmission line separate from the second transmission line, the fourth transmission line configured to couple the receiver port to the second antenna port, wherein the second and third transmission lines cross at a cross-over section.

12. The switch of claim 11 wherein at least one of the first, second, third and fourth transmission lines include bends that form generally 'T' shaped patterns.

13. The switch of claim 11 wherein at least one of the first, second, third and fourth transmission lines comprise quarter-wavelength micro-strip lines.

14. The switch of claim 11 a length of adjacent first, second, third and fourth transmission lines is sized such that edge coupling is weak.

15. The switch of claim 11 wherein:

the first antenna port comprises a vertical port;

the second antenna port comprises a horizontal port; and the transmission lines are configured such that a current at the transmitter port flows in a first direction from the transmitter port to the vertical port, and flows in a different direction from the transmitter port to the horizontal port, and a current at the receiver port flows in a first direction to the receiver port from the vertical port, and flows in a different direction to the receiver port from the horizontal port.

16. The switch of claim 11 wherein the second transmission line and the third transmission line cross at a right angle.

17. The switch of claim 11, where the cross-over section is configured to isolate the second transmission line from the third transmission line.

18. A method, comprising:

Sending and receiving communication signals by a transceiver;

connecting, via four single-pole, single-throw switches connected in shunt to one another, the transceiver to an antenna, the four single-pole, single-throw switches configured to operate as a double-pole, double-throw switch; and controlling, via the double-pole, double-throw switch, at least two directions of polarization of the antenna.

19. The method of claim 18, further comprising controlling a transmit mode and a receive mode of the transceiver.

20. The method of claim 18, further comprising controlling excitation of the antenna having a polarization in a first direction and excitation of a second antenna having polarization in a second direction.

* * * * *